United States Patent
Kadirvel et al.

(10) Patent No.: US 9,706,040 B2
(45) Date of Patent: Jul. 11, 2017

(54) SYSTEM AND METHOD FOR FACILITATING COMMUNICATION VIA INTERACTION WITH AN AVATAR

(71) Applicants: Udayakumar Kadirvel, Bangalore (IN); Subrhmanyam Sarada Ayyagari, Bangalore (IN); Cherukulath Ravi Sujith Kumar, Bangalore (IN); Vinnakote Siddhartha, Bangalore (IN)

(72) Inventors: Udayakumar Kadirvel, Bangalore (IN); Subrhmanyam Sarada Ayyagari, Bangalore (IN); Cherukulath Ravi Sujith Kumar, Bangalore (IN); Vinnakote Siddhartha, Bangalore (IN)

( * ) Notice: Subject to any disclaimer, the term of this patent is extended or adjusted under 35 U.S.C. 154(b) by 252 days.

(21) Appl. No.: 14/069,332

(22) Filed: Oct. 31, 2013

(65) Prior Publication Data

US 2015/0121251 A1 Apr. 30, 2015

(51) Int. Cl.
| | |
|---|---|
| *H04M 1/725* | (2006.01) |
| *H04W 4/12* | (2009.01) |
| *G06F 3/0481* | (2013.01) |
| *G06F 3/0484* | (2013.01) |

(52) U.S. Cl.
CPC ...... *H04M 1/72544* (2013.01); *G06F 3/0481* (2013.01); *G06F 3/0484* (2013.01); *H04W 4/12* (2013.01); *H04M 1/72547* (2013.01)

(58) Field of Classification Search
CPC ... H04M 1/72544; H04W 4/12; G06F 3/0481; G06F 3/0484
See application file for complete search history.

(56) References Cited

U.S. PATENT DOCUMENTS

| | | | |
|---|---|---|---|
| 5,880,731 A | 3/1999 | Liles et al. | |
| 7,908,554 B1 | 3/2011 | Blattner | |
| 8,250,144 B2 | 8/2012 | Blattner et al. | |
| 2007/0113181 A1 | 5/2007 | Blattner et al. | |
| 2009/0063283 A1* | 3/2009 | Kusumoto | G06Q 30/02 705/14.25 |
| 2009/0158184 A1 | 6/2009 | Blattner et al. | |
| 2009/0187825 A1* | 7/2009 | Sandquist et al. | 715/719 |
| 2010/0082751 A1 | 4/2010 | Meijer et al. | |
| 2011/0296324 A1* | 12/2011 | Goossens et al. | 715/763 |
| 2012/0330736 A1* | 12/2012 | Beckner et al. | 705/14.16 |
| 2013/0258040 A1* | 10/2013 | Kaytaz | H04N 7/157 348/14.07 |
| 2013/0263014 A1* | 10/2013 | Chalak | 715/752 |

OTHER PUBLICATIONS

"Sending Polls in Outlook 2007", Brian Burgess, Aug. 10, 2007.*

* cited by examiner

*Primary Examiner* — Li Sun
(74) *Attorney, Agent, or Firm* — Ariel S. Bentolila; Bay Area IP Group LLC

(57) ABSTRACT

A method, system and program product comprise processing a sender's inputted text message. The text message is combined with a selected avatar representing the sender. The avatar is combined with a selected state of mind. The selected state of mind is modified with a selected intensity. At least the text message and the combined avatar are ordered into a scene of a sender's message in an order specified by the sender. The sender's message is transmitted to a receiver's device where the sender's message is operable to be viewed by the receiver in the order specified by the sender.

20 Claims, 16 Drawing Sheets

SYSTEM AND METHOD FOR FACILITATING COMMUNICATION VIA INTERACTION WITH AN AVATAR

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to facilitating communication. More particularly, the invention relates to facilitating communication through electronic devices.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Though electronic devices may be frequently used as a means and method for communicating, users often find it difficult to fully express themselves through such devices.

One known solution shows a system in which information may be communicated using a change in an avatar's appearance. Another known solution teaches of avatars that graphically represent users in a communications session, and the avatars are capable of being animated. Yet another known solution teaches of a way for disseminating a subset of a user's use context to recipients and/or sender of electronic messages. Still, another known solution discloses a system and method that allow computing device users to convey emotional expressions graphically. Further, yet another known solution discloses avatars representing participants in a graphic chat session. Still, yet another known solution discloses a method for enabling a selection of wallpaper to modify a mood projected by an avatar. Finally, another known solution discloses a method for enabling multiple online personas in an instant messaging communication session. However, each of these known solutions falls short of fully allowing users to express themselves through electronic devices. A solution which enabled users to further and more fully express themselves would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
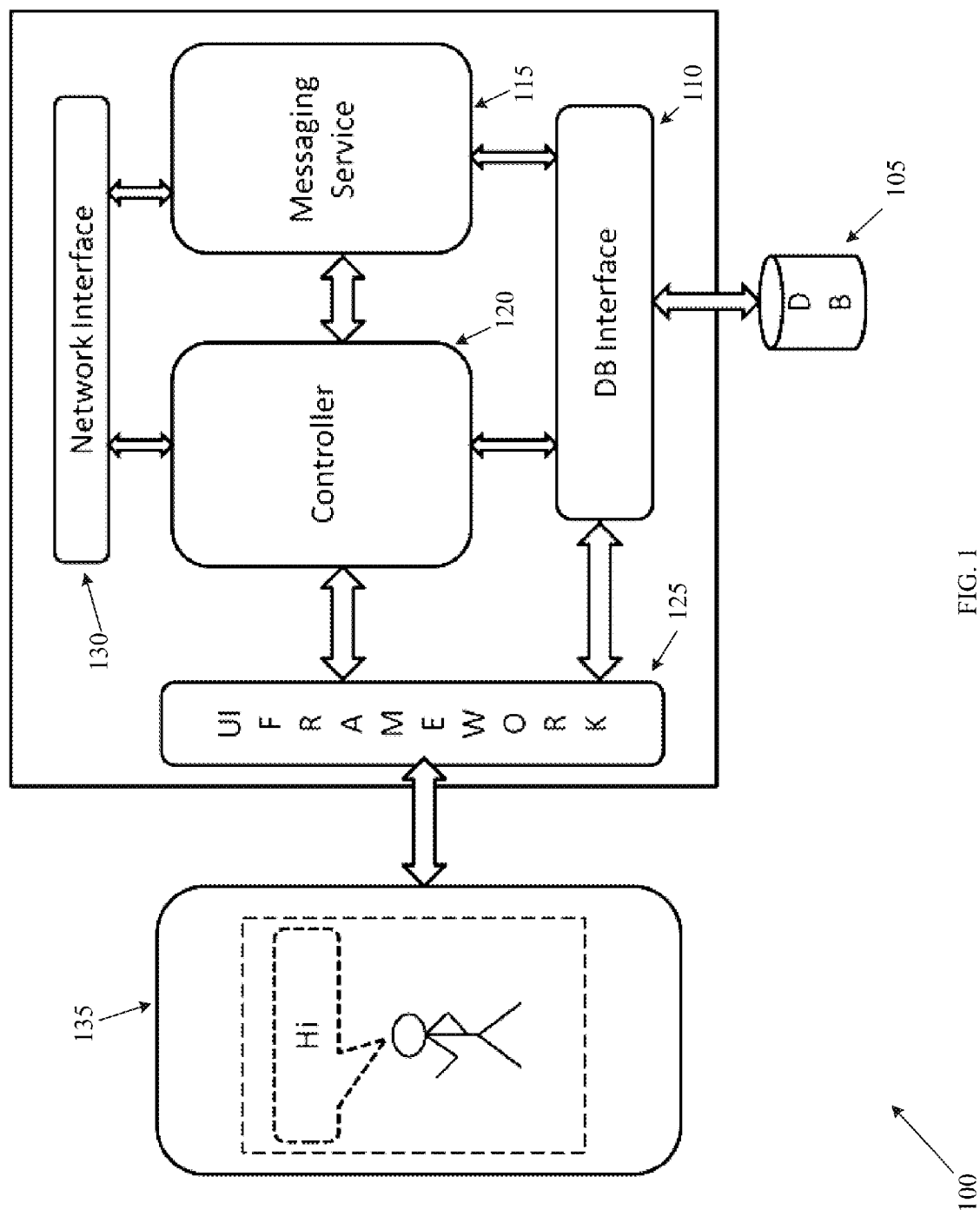
FIG. 1 is an illustration of an exemplary system whereby users may receive data from a database, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, GSM, 3G, 4G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM™ MQSeries™ technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Embodiments of the present invention provide means and methods for facilitating communication.

FIG. 1 is an illustration of an exemplary system whereby users may receive data from a database, in accordance with an embodiment of the present invention. In the present embodiment, information may be stored in a database 105. The database 105 may pass information through means of a database interface 110 to a messaging service 115, a controller module 120, and/or a user interface framework 125. The messaging service 115 may parse information and pass extracted relevant information to the controller module or a network interface 130. The controller module 120 may process information and transmit processed information to other modules. The user interface framework 125 may receive stored information, convert stored information to a format compatible with a user's device 135, and transmit the information to the device 135. The user interface framework 125 may also receive information from a device 135 and transmit the information to other modules. The network interface 130 may receive and transmit information for use in external systems.

Figure 2:
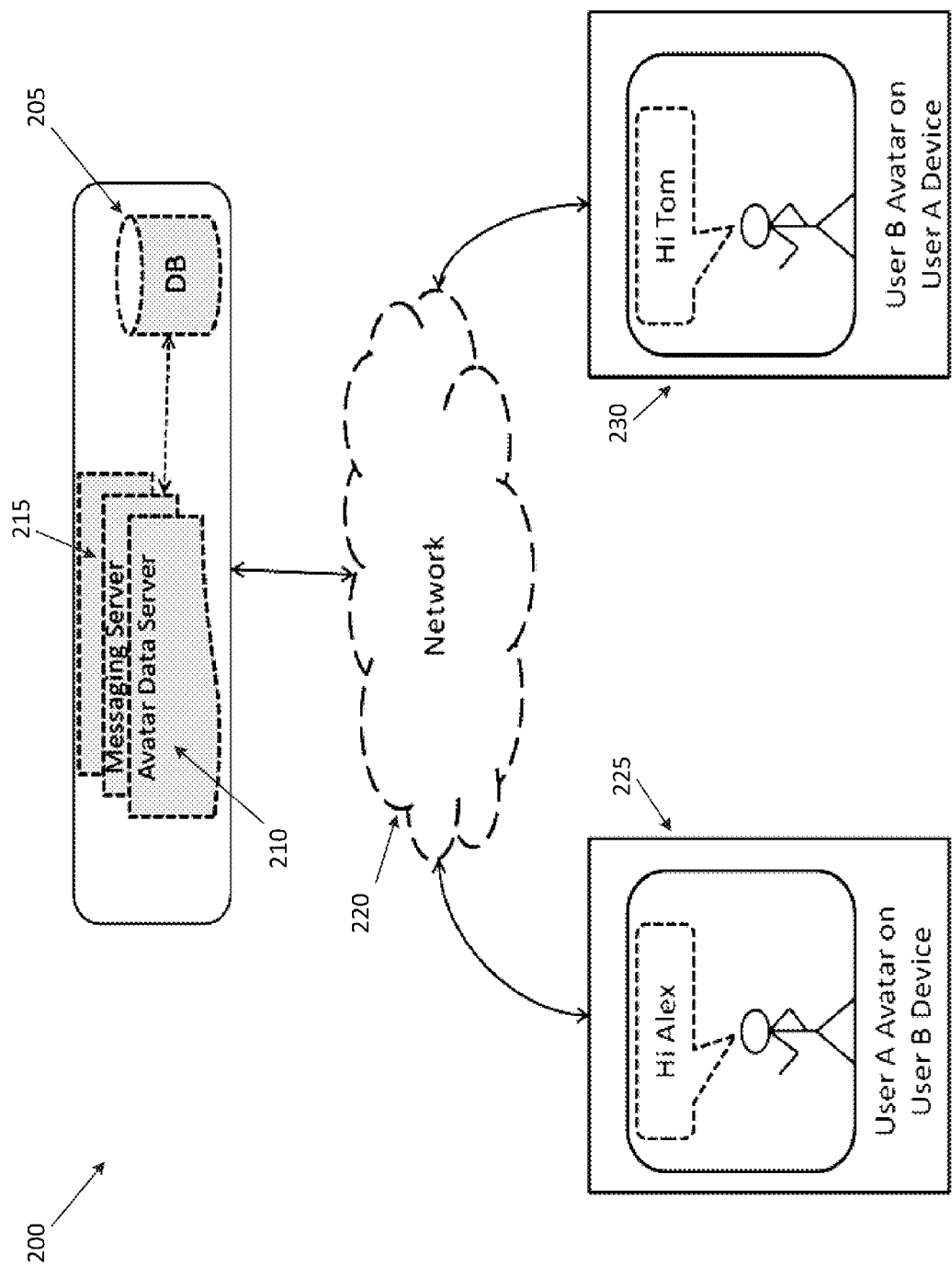
FIG. 2 is an illustration of an exemplary system whereby users may communicate with other users, in accordance with an embodiment of the present invention.

FIG. 2 is an illustration of an exemplary system whereby users may communicate with other users, in accordance with an embodiment of the present invention. In the present embodiment, information may be stored in a database 205. The database may communicate bi-directionally with various servers, including, without limitation, an avatar data server 210 and a messaging data server 215. The database 205 and servers may communicate bi-directionally with a network 220 which may communicate bi-directionally with various users. A first user 225 may thereby communicate with a second user 230.

Figure 3:
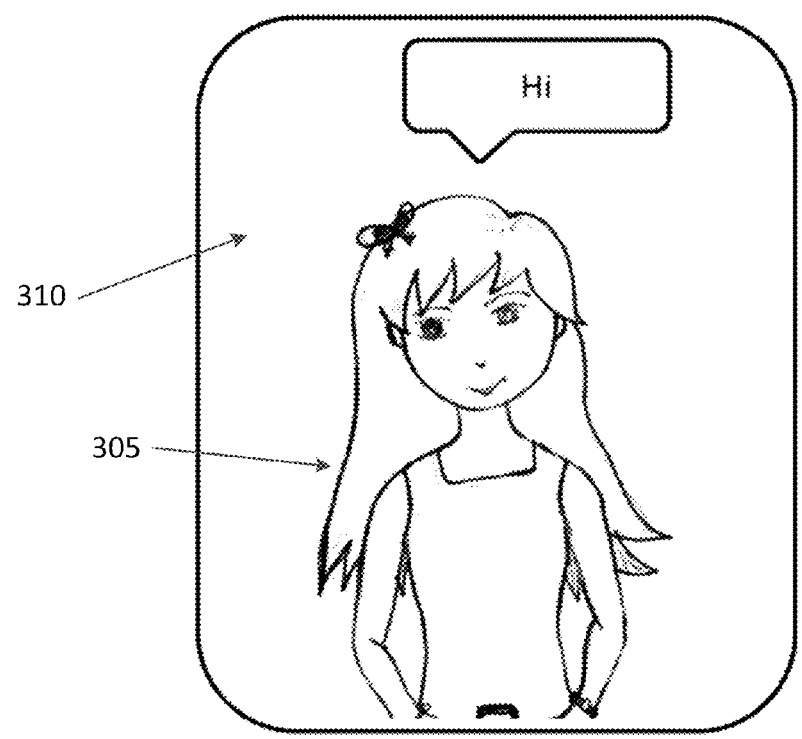
FIG. 3 is an illustration of an avatar 305, in accordance with an embodiment of the present invention.

FIG. 3 is an illustration of an avatar 305, in accordance with an embodiment of the present invention. In many embodiments, an avatar 305 may be a graphical representation of a user and may reflect a personality or special characteristics of the user. In some embodiments, an avatar 305 may be a means of expression through use of physical attributes with an abstract quality. In many embodiments, an avatar 305 may take the shape of humans or other characters represented by, without limitation, animals, birds, toys, cartoon characters, caricatures, and any objects which a user may relate.

In many embodiments, an avatar 305 may take a 2-dimensional (2D) or 3-dimensional (3D) appearance. In some embodiments, avatars 305 may be predefined and available for users to choose from. In other embodiments, users may create avatars 305. In some of these embodiments, users may upload photos to the avatar data server 210 and the avatar data server 210 may generate a 2D or 3D avatar 305 from caricatures of the photos provided. In some embodiments, avatar 305 creation may be an online process by which an avatar 305 may be created in real-time.

In some embodiments, users may change an appearance of an avatar 305 by adjusting accessories accompanying the avatar 305. Accessories may include, without limitation, clothing, shoes, hats, jewelry, and glasses. In many embodiments, users may choose a background 310 accompanying an avatar 305. In some of these embodiments, the background 310 may be a non-animating image (for example, without limitation, a sky background) or an animating visual (for example, without limitation, a park with people moving around).

Figure 4:
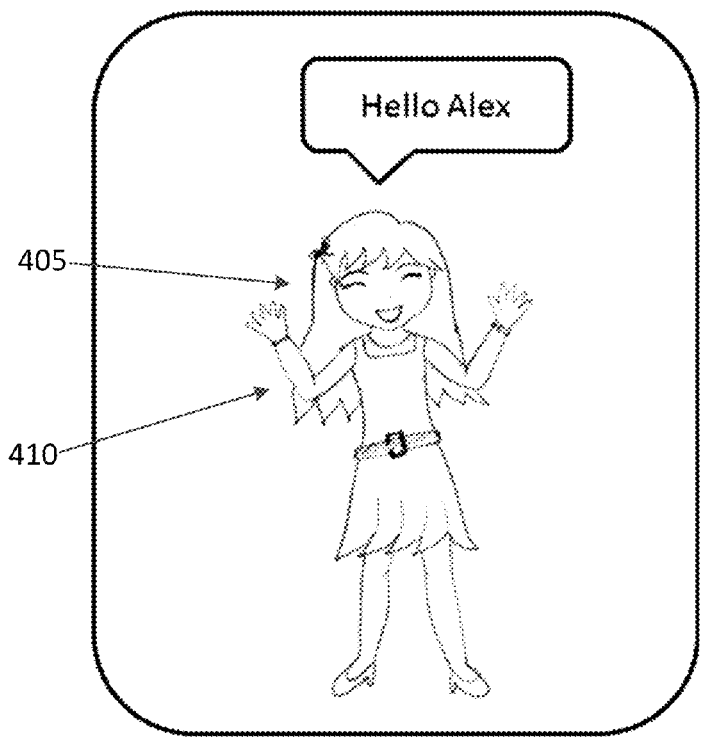
FIG. 4 is an illustration of an avatar 305 exhibiting facial and bodily communication, in accordance with an embodiment of the present invention.

FIG. 4 is an illustration of an avatar 305 exhibiting facial and bodily communication, in accordance with an embodiment of the present invention. States of mind which may be characterized by facial expressions may be referred to as emotions 405, while states of mind which may be characterized by body language may be referred to as mimes 410. In many embodiments, avatars 305 may exhibit various states of mind, including, without limitation, happy, sad, depressed, guilty, bored, lazy, jealous, good, annoyed, drowsy, tipsy, offended, disgusted, proud, romantic, disappointed, upbeat, energized, sorry, frightened, shy, insecure, and surprised. In some embodiments, emotions 405 and mimes 410 may function conjunctively. In some embodiments, emotions 405 and mimes 410 may function independently. In a non-limiting example, an avatar 305 may communicate surprise with an emotion 405 featuring raised eyebrows and an open mouth and a mime 410 featuring a hand covering the open mouth. In some embodiments, emotions 405 and/or mimes 410 may be internally represented as strings mapped to instruction codes. Each emotion 405 and/or mime 410 may be a unique instruction code that a text messaging client may map and interpret.

In some embodiments, an avatar's 305 presentations of emotions 405 and/or mimes 410 may include, without limitation, avatar 305 animations, text messages, graphical schemes, sounds, audios, and backgrounds.

Figure 5:
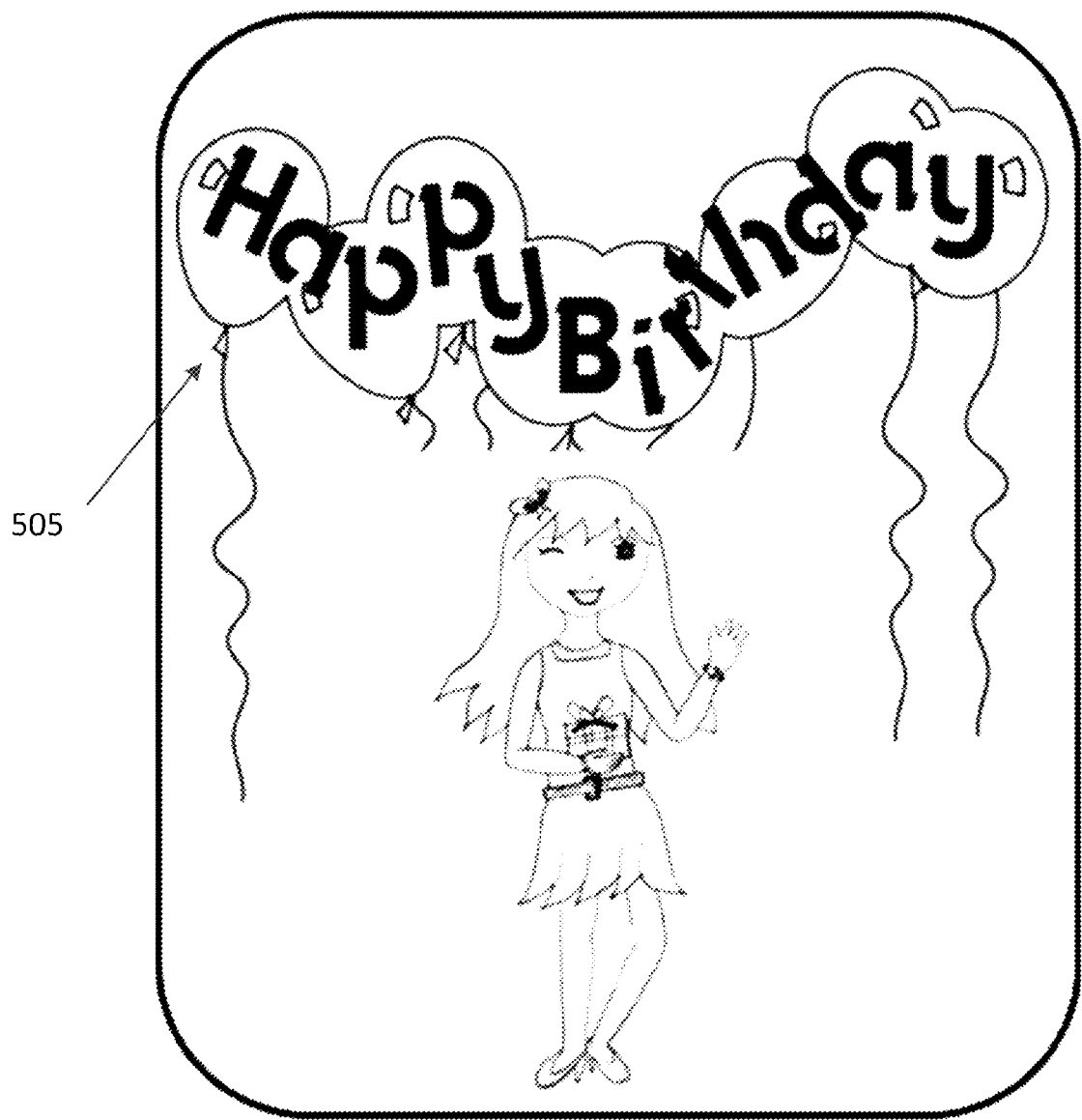
FIG. 5 illustrates an exemplary graphical scheme, in accordance with an embodiment of the present invention.

FIG. 5 illustrates an exemplary graphical scheme, in accordance with an embodiment of the present invention. In some embodiments, a graphical scheme 505 may be a collection of animated or non-animated images which may add value to a presentation. In many embodiments, graphical schemes 505 may be used when sending, receiving and/or viewing a message. In some embodiments, graphical schemes 505 may be implicit or explicit. An implicit graphical scheme 505 may be added automatically when a user selects a certain emotion 405 and/or mime 410. An explicit graphical scheme 505 may be selected by a user.

Some embodiments may have scenes. A scene may be a collection of presentation information viewable to users. In one embodiment, a scene may be composed of background images, one or more avatars 305, graphical schemes 505, text messages and/or other icons/images viewable to users. In some embodiments, scenes may have many points of view which allow certain objects to be visible and invisible in a scene. A point of view may be referred to as a user view. In some embodiments, objects which are visible in one user view may not be visible in some other user view.

In many embodiments, mimes 410 may be any kind of body language, including, without limitation, poses or movement of body parts. Suitable body parts may include, without limitation, head, hands, legs, shoulders, or face. In many embodiments, mimes 410 may be modeled as a combination of emotion 405 and body language. In some embodiments, each mime 410 may have one emotion 405 used conjunctively with it at any point in time. Mimes 410 may convey operations of verbs, including, without limitation, wishing, asking, saying, offering, hugging, greeting, praying, thanking, kissing, slapping, giving a high five, kicking, puking, sleeping, playing, drinking, eating, thinking, inviting, mocking, cycling, driving, and crying.

In some embodiments, an emotion 405 may be represented solely by a facial expression and a mime 410 may be represented by an animation that synchronizes facial expressions and body language. In some embodiments, an emotion 405 may be represented by an animation which has body language along with the facial expression. In some of these embodiments, if a user creates a message and decides to choose a mime 410 for some action, then an emotion 405 may be selected automatically or manually to be used with the action. In a non-limiting example, if a user selects a mime 410 called "Hi" which may involve an avatar 305 waving a hand, the mime 410 may have a "Happy" emotion 405 associated to it by default. In the present non-limiting example, a graphical effect shown may be an avatar 305 with a waving hand animation and a smile animation rendered substantially simultaneously. In other embodiments, a user may manually associate any emotion with any mime. In a non-limiting example, a user may select the mime 405 called "Hi" and an emotion called "Bored". In the present non-limiting example, a resulting graphical effect may be a waving hand animation and a yawning facial animation.

In many embodiments, any avatars 305, emotions 405, mimes 410, avatar accessories, graphical schemes 505, and backgrounds may be available in the avatar data server 210 within an application infrastructure. In some embodiments, these may be supplied as part of an application installation or may be downloaded at any point of time by a client onto a device.

A user who sends a message may be referred to as a sender. A user intended to receive a message sent by a sender may be referred to as a receiver. A device may indicate any equipment used my senders and/or receivers to communicate, including, without limitation, smartphones, tablets, or computers.

In some embodiments, a sent message may be converted to a JavaScript Object Notation (JSON) object which may encapsulate any information chosen and entered by a user. In some of these embodiments, the JSON object may include, without limitation, sender information, recipient information, message creation time, avatar 305 information, message text, emotions 405 and/or mimes 410 as instruction codes, accessories as instruction codes, thumbnails, Uniform Resource Locators (URLs) for audio, video, and photos, and information on graphical schemes 505. The JSON object may store text and/or any emotions 405 and/or mimes 410 as instruction codes in a sequence of order of creation. Any information may be stored locally on a user's device as part of a database instance or file system.

In many embodiments, a message may have text interleaved with avatar 305 emotions 405 and/or mimes 410. In a non-limiting example, a message may have text, then an emotion 405 and/or mime 410, then text again, and so on. In some embodiments, a message may be a plain text or an emotion 405 and/or a mime 410 with a message.

In some embodiments, a message may be transmitted over a network suitable for conveying the message between, without limitation, a sender device, a receiver device, the messaging server 215, the avatar data server 210, and other network devices. In many embodiments, a message transmission may occur via a server between multiple devices, from a device to a server, or from a server to a device. In some embodiments, a device may use, without limitation, a mobile data network, wireless Local Area Network (LAN), and/or any other transmission networks through which data may be transferred to send and receive messages.

In many embodiments, senders may create messages on devices. A message may include, without limitation, text, emotions 405, mimes 410, and graphical effects in any combination. In some embodiments, senders may enter text by any available means, including, without limitation, keypad, touch screen, or mouse. In other embodiments, freehand drawing may be furnished by a user in a drawing pad area provided. A drawing pad area may capture user strokes and user strokes may be included in a message. In some embodiments, a sender may be provided with provisions in a user interface to input emotions 405 and/or mimes 410. Provisions may include, without limitation, a virtual keypad of emoticons wherein each emoticon represents an emotion 405 or mime 410 that an avatar 305 may emulate with animations. In a non-limiting example, a user may create a text message reading "Can we go for coffee" and a mime 410 showing an avatar 305 extending an invitation to a virtual coffee shop may be chosen by selecting an emoticon titled "Inviting for Coffee." In some embodiments, a user may choose to preview a message before sending. In some of these embodiments, a preview may occur exactly as the message may be rendered on a receiver's device.

In a non-limiting example, a user may choose various emotions 405 and mimes 410 to be associated with a sequence of three text messages: "Hi," "Congratulations on winning the game!" and "Let's celebrate." In the present non-limiting example, the user may select three mimes 410: "Hi," "Congrats," and "Celebration." Further, in the present non-limiting example, the user may select one emotion 405: "Happy." The user may create a first scene by selecting the "Hi" message to be associated with the "Hi" mime 410 and the "Happy" emotion, in which case the message, mime 410, and emotion 405 may be displayed simultaneously. The user may then select the "Congratulations on winning the game!" message to be associated with the "Congrats" mime 410 and the "Happy" emotion 405, in which case this scene may be displayed simultaneously after the first scene may have been displayed. A third scene may be comprised of the "Let's celebrate" message, the "Celebration" mime 410, and the "Happy" emotion 405, and may be displayed after the second scene may have been displayed. In the present non-limiting example, a preview may first display the "Hi" message with a sender's avatar 305 showing a smiling facial animation (the "Happy" emotion 405) and an animation of a hand waving (the "Hi" mime 410). Next, the "Congratulations on winning the game!" message may be appended to the "Hi" message and the sender's avatar 305 may show a smiling facial animation along with a thumbs up animation (the "Congrats" mime 410). Finally, the "Let's celebrate" message may be appended to the "Congratulations on winning the game!" message and the sender's avatar 305 may show a smiling facial animation along with an animation of opening a champagne bottle (the "Congratulations" mime 410).

In some embodiments, senders may enable a message delivery report to receive an acknowledgment that a message may have been delivered to intended receivers. In some other embodiments, users may tag messages. In some of these embodiments, messages may be grouped based on tags. Tags may be descriptive or colored symbols assigned to messages.

A messaging service running on a receiver's communication device may receive messages intended for the receiver. In many embodiments, a message may be received as a JSON object, which may be parsed by the messaging service 115 and relevant information needed to play the message may be extracted. Parsed information may be given to the controller module 120 for further processing. To play a message, the controller module 120 may gather all information from the JSON object and load data from local storage. If data is not available on a local storage medium, a communication application may contact the avatar data server 210 and download missing data.

In some embodiments, receivers may tag received messages. In some of these embodiments, receivers may group messaged based on tags. Tags may be descriptive or colored symbols assigned to messages.

In many embodiments, the controller module 120 may display a text message and render an avatar 305 along with any associated emotions 405 or mimes 410 on a display device. Text, emotions 405, and/or mimes 410 may be displayed in an order chosen by a sender. If an emotion 405 and/or mime 410 has an associated implicit graphical scheme, then any components of the graphical scheme, including, without limitation, animated images, non-animated images, or audio may be played along with the message. If there are any explicit graphical schemes included in a message then the explicit graphical schemes may also be played along with any relevant animations.

In some embodiments, a mime 410 and/or emotion 405 performed by a first avatar 305 may cause a mime 410 and/or emotion 405 by a second avatar 305. In some of these embodiments, the first avatar 305 and the second avatar 305 may be displayed together a screen. This causal relationship between two avatars 305 may be referred to as interaction. Interaction may have an impact on a facial expression and/or body language of an avatar 305. A change in facial expression and/or body language as a result of interaction may be termed as "sequel mime."

Figure 6A:
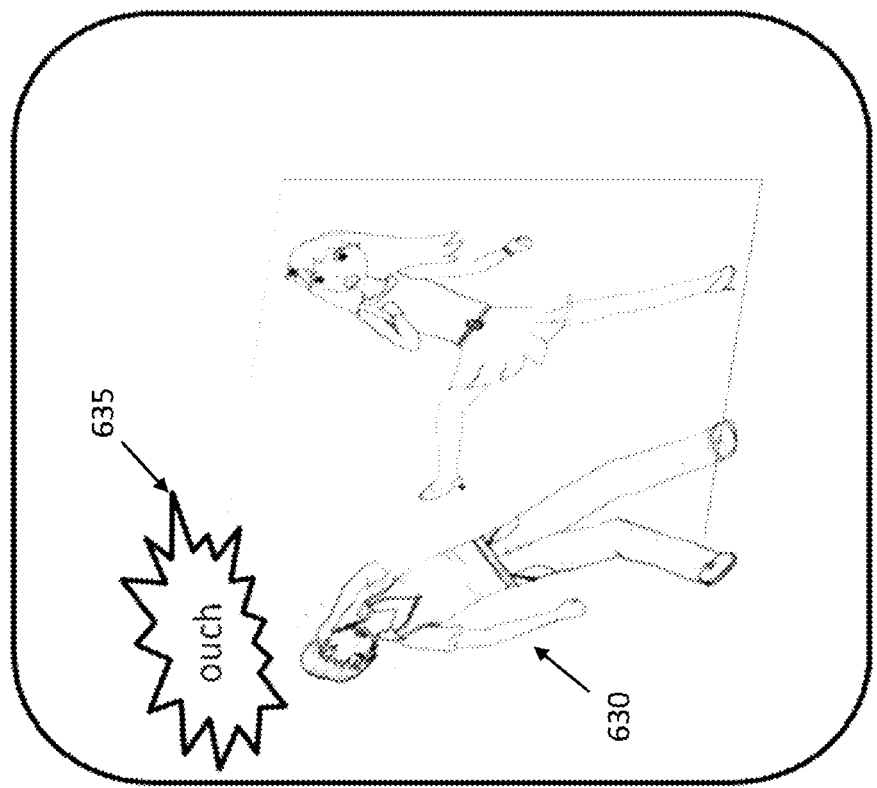
FIG. 6A illustrates a non-limiting example of interaction between multiple avatars 305, in accordance with an embodiment of the present invention.
Figure 6A:
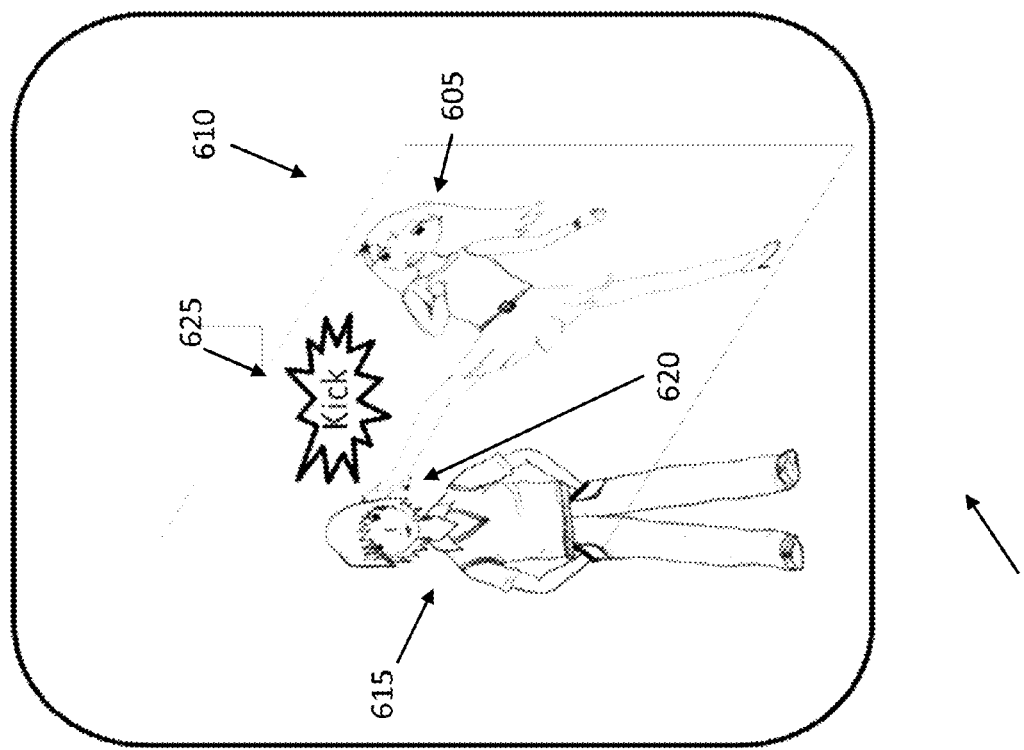

FIG. 6A illustrates a non-limiting example of interaction between multiple avatars 305, in accordance with an embodiment of the present invention. In the present non-limiting example, a first avatar 605 may send a "kick" mime 610 to a second avatar 615. The first avatar 605 may belong to a first user and the second avatar 615 may belong to a second user. The first avatar 605 may be displayed on a right side of a screen and the second avatar 615 may be displayed on a left side of a screen. In alternative embodiments, avatars 305 may be situated at any part of a screen. After the first user selects the "kick" mime 610, the first avatar 605 may kick with one leg 620 towards the second avatar 615. At a moment of impact, an animated banner image 625 with a text "kick" at a location of impact may be displayed along with any accompanying effects, including, without limitation, a sound conveying a kick. During or after the moment of impact, a sequel mime 630, such as "got kicked," may be played which may portray pain in facial expressions and falling down body language. A second animated image 635 with text "ouch" may be displayed along with any accompanying effects. In the present non-limiting example, any graphical schemes used may be implicit graphical schemes associated with a mime 410.

In some embodiments, orientation of a device may be identified based on information of sensors and contents of a display and may be adjusted to portrait or landscape mode based on a current orientation. In some of these embodiments, message composition and/or message viewing may be different in portrait and landscape mode.

In an embodiment in which portrait mode may be an option, when portrait mode is selected only one avatar 305 may be shown on a display screen during message composition and/or message viewing. During message composition, an avatar 305 shown may be the avatar 305 associated with a sender. In other embodiments, multiple avatars 305 may be shown on a display screen while in portrait mode.

Figure 6B:
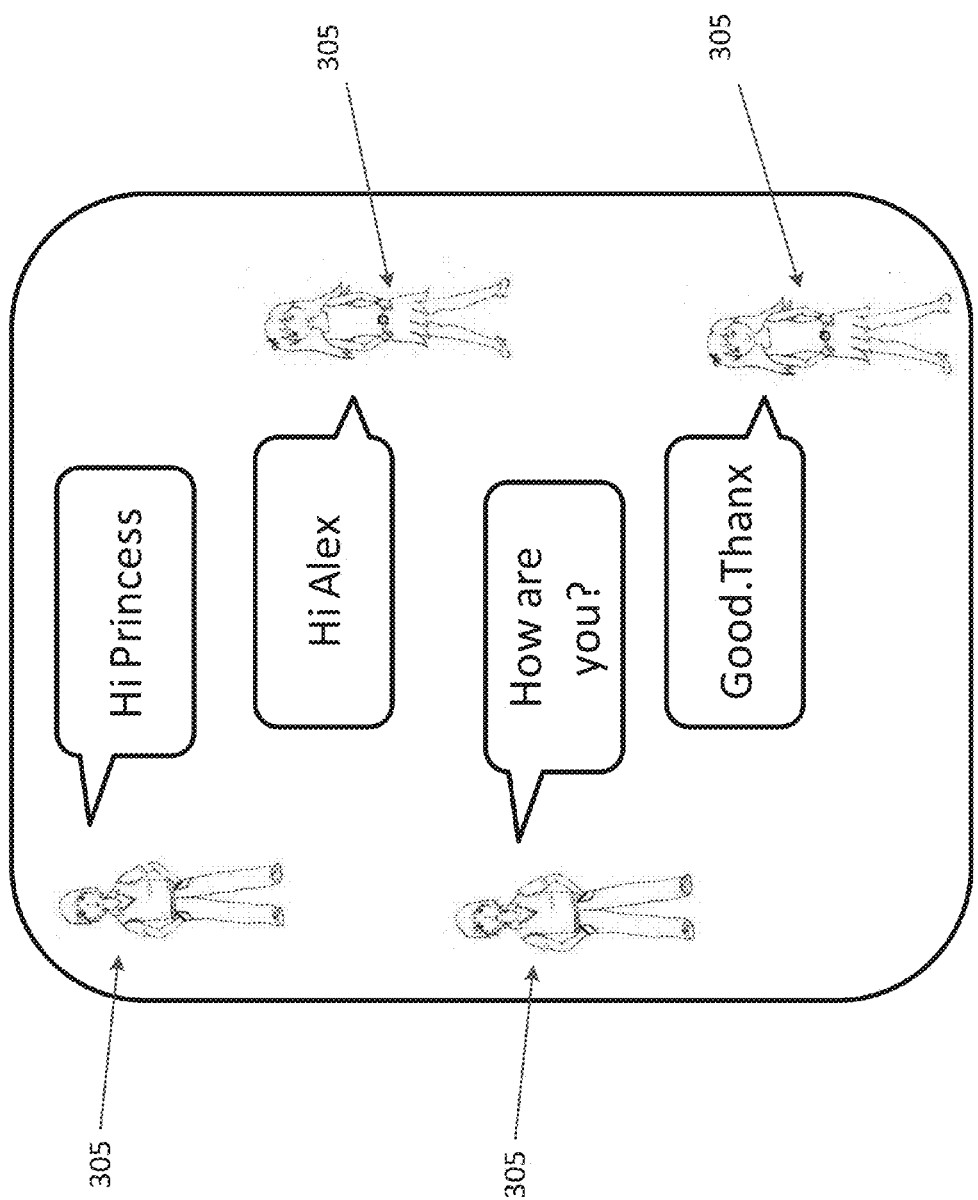
FIG. 6B illustrates a non-limiting example of multiple instances of receiver and sender avatars, in accordance with an embodiment of the present invention

FIG. 6B illustrates a non-limiting example of multiple instances of receiver and sender avatars 305, in accordance with an embodiment of the present invention. In some embodiments there may be multiple instance of receiver and sender avatars shown in the display screen to represent a conversation between them. In some embodiments, a sender's avatar 305 may be shown on a right side of a screen and a receiver's avatar 305 may be shown on a left side of the screen. In alternative embodiments, the sender's avatar 305 may be shown on the left side of the screen and the receiver's avatar 305 may be shown on the right side of the screen.

In an embodiment in which landscape mode may be an option, when landscape mode is selected avatars 305 associated with both a sender and a receiver may be shown on a display screen during message composition and/or message viewing. In some embodiments, a sender's avatar 305 may be shown on a right side of a screen and a receiver's avatar 305 may be shown on a left side of the screen. In alternative embodiments, the sender's avatar 305 may be shown on the left side of the screen and the receiver's avatar 305 may be shown on the right side of the screen. In other embodiments, any number of avatars 305 may be shown on a display screen while in landscape mode.

In a few embodiments in which portrait mode or landscape mode may be preferred for certain functions, users may be notified by any means, including, without limitation, animated icons, to change to a preferred mode for improved viewing.

In many embodiments, intensity of any emotion 405 and/or mime 410 may be varied according to a set intensity level. In some embodiments, intensity may range from "low" to "normal" to "high." In alternative embodiments, any number of intensity levels may be available. In some embodiments, intensity level for emotions 405 and/or mimes 410 may be set to "normal" as default. In alternative embodiments, any intensity level may be a default. In some embodiments, users may change the intensity level during creation of a message. A "normal" intensity level may cause a natural or standard animation for a corresponding emotion 405 and/or mime 410. A "low" intensity level may cause a subdued or subtle animation. A "high" intensity level may cause a wide or over reactive animation.

Figure 7:
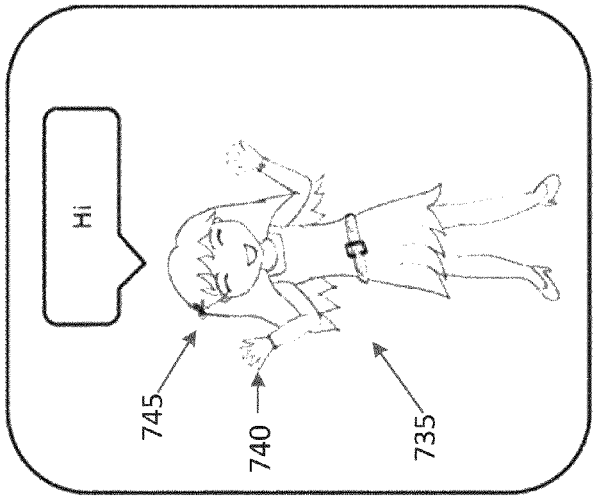
FIG. 7 illustrates a non-limiting example of varying intensity levels, in accordance with an embodiment of the present invention.
Figure 7:
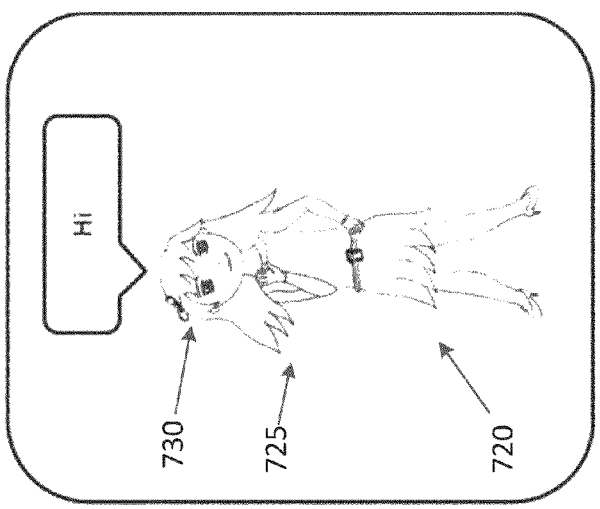
Figure 7:
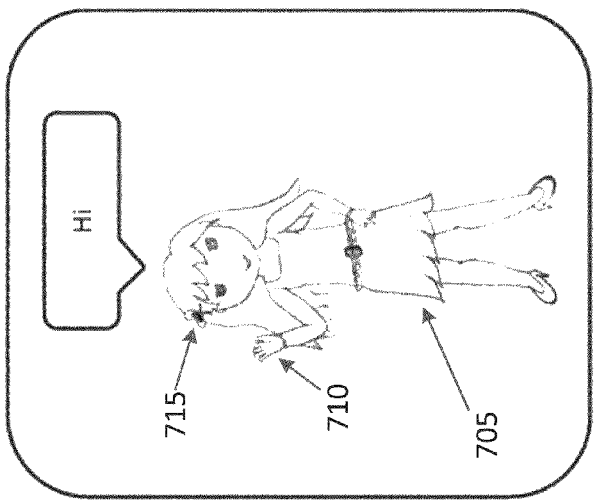

FIG. 7 illustrates a non-limiting example of varying intensity levels, in accordance with an embodiment of the present invention. In the present non-limiting example, a "hi" mime 405 may have a "happy" emotion 410 associated with it. A message created with the "hi" mime 405 and a default "normal" intensity level may cause an animation of an avatar 705 with one hand waving 710 along with a smiling animation 715. A "low" intensity level may cause an animation of an avatar 720 with a mellowed hand waving 725 and a restrained smile 730. A "high" intensity level may cause an animation of an avatar 735 with both hands waving 740 and a broad smile 745.

In some embodiments, users may interact with avatars 305 and/or scene. In some of these embodiments, certain emotions 405 and/or mimes 410 may allow for certain types of input by users to cause a response by an avatar 305 which may send a predefined response automatically. In other embodiments, input by a user may result in an avatar 305 associated with the user to interact with another avatar 305. The user may be notified visually of the method of interaction by any means including, without limitation, animated icons, text notification, to interact with the avatar and/or scene using which predefined response may be sent. In some embodiments the user input may or may not be the combination of following input techniques, not limited to, touch sensor, gravity sensor, accelerometer sensor, gesture sensors.

Figure 8:
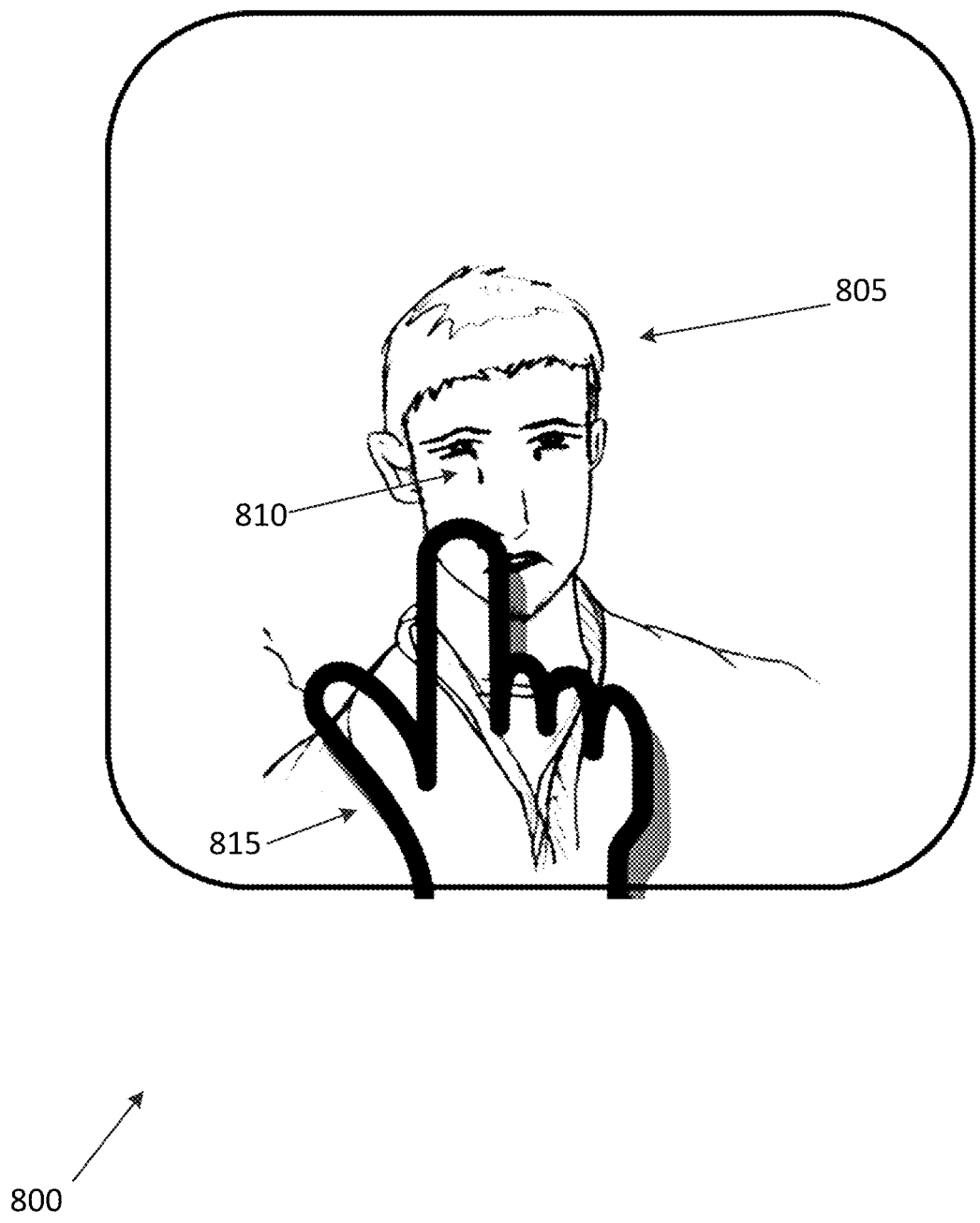
FIG. 8 illustrates a non-limiting example of interaction between users and avatars 305, in accordance with an embodiment of the present invention.

FIG. 8 illustrates a non-limiting example of interaction between users and avatars 305, in accordance with an embodiment of the present invention. In the present non-limiting example, a sender may send a message with an avatar 805 displaying a "cry" emotion 405 and/or mime 410 to a receiver. The "cry" emotion 405 may cause a graphical representation of tears 810. The receiver may wipe the tears 815 by touching below eyes of the avatar 805 which may stop the graphical representation of tears 810. In a non-limiting example, this action may result in sending a "Don't Cry" message as a response to the sender automatically without user typing the message. In another non-limiting example, the receiver action of wiping tears may cause an avatar 305 associated with the receiver to wipe the tears of an avatar 305 associated with the sender.

In some embodiments, users may send messages to other users in such a way that more information may be added to the messages as the messages may be propagated to a final destination. A message may not be directly sent to a final destination, but instead may be routed through other predefined users who add to or modify the message as it passes through. An intermediate user may peek into a message, view information and modify the message before forwarding the message to a next user in a chain. In a non-limiting example, a first user may create a message with a "birthday" mime 410 and propagate the message to a final user who may be celebrating a birthday. In the present non-limiting example, the first user may mark the message as a "chained" message and include a second and third user as "contributors" before the message reaches the final user. The message may be delivered to the second user who may read the message and append new birthday wishes or emotions 405, mimes 410, or graphical schemes to the message. The second user may then send the message and the message may be deliver to the third user, who may also modify the message. The third user may then send the message and the message may be delivered to the final user. In some embodiments, avatars 305 of original senders and contributors may be shown together when a message may be viewed by a final receiver. In other embodiments, only certain avatars 305 may be displayed at certain portions of a message.

In some embodiments, messages may be sent to receivers without any special delivery mechanisms. In other embodiments, users may have options to choose different message sending and/or receiving mechanisms. These mechanisms may be explicit graphical schemes. In some embodiments, a sender may choose from listed options of graphic schemes to be applied for sending and/or receiving a particular message. In some of these embodiments, when a message is sent, a message animation for a selected graphical scheme may be played. When a message is received, the message may be displayed using an incoming message animation based on the graphical scheme selected by the sender.

Figure 9A:
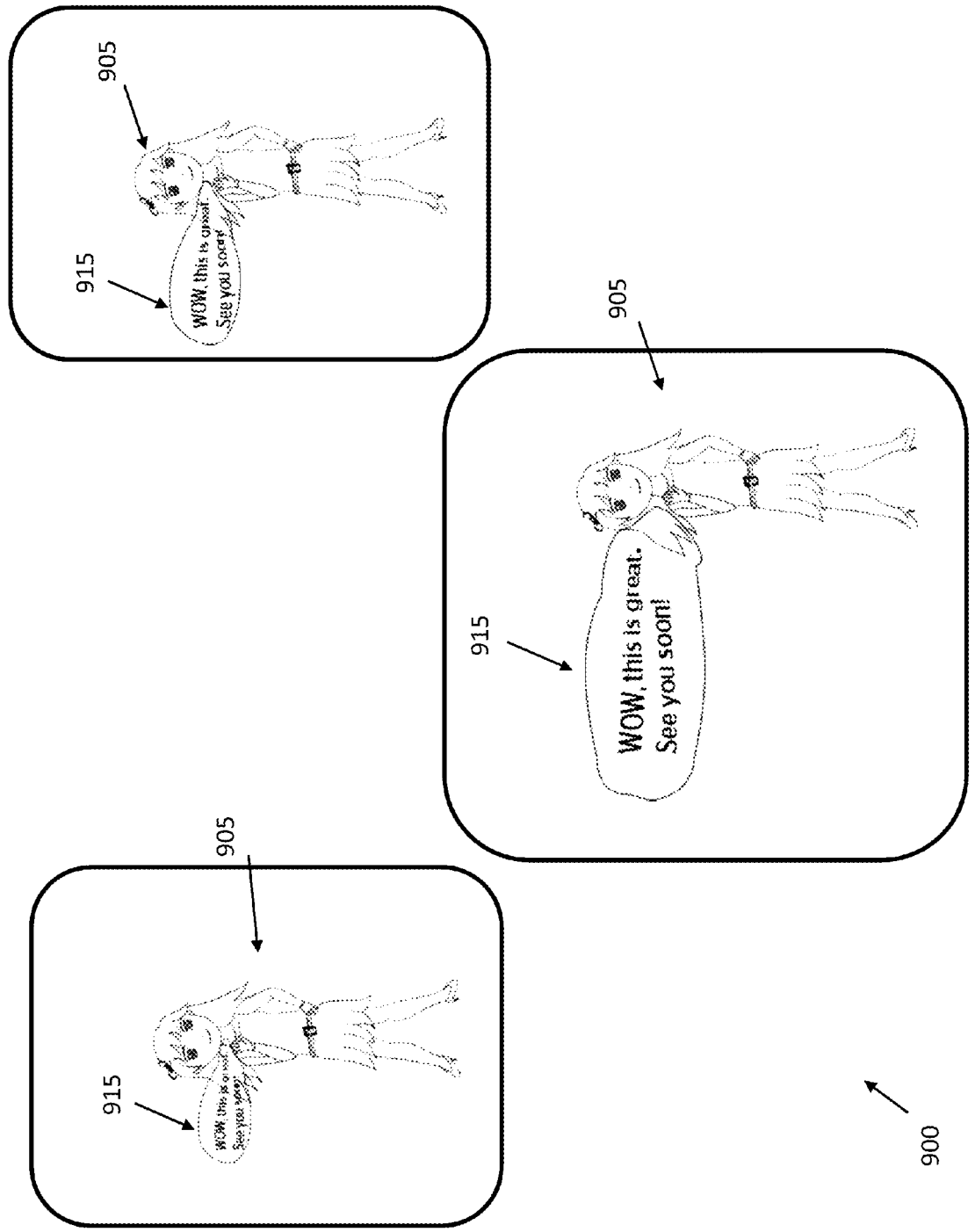
FIGS. 9A and 9B illustrate non-limiting examples of an animated text mechanism, in accordance with embodiments of the present invention.
Figure 9B:
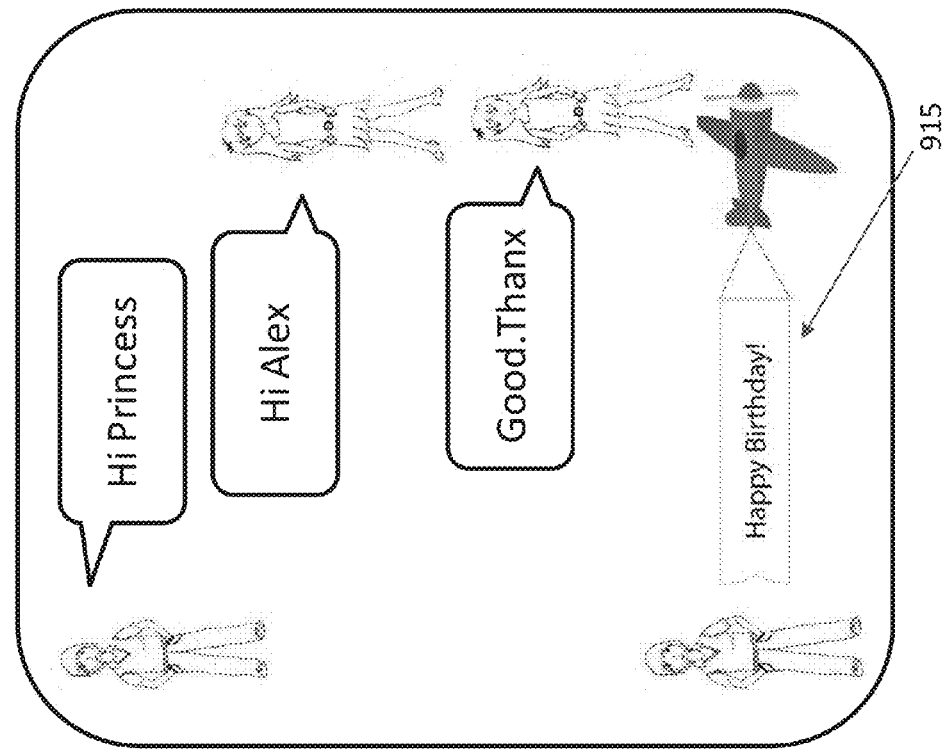
Figure 9B:
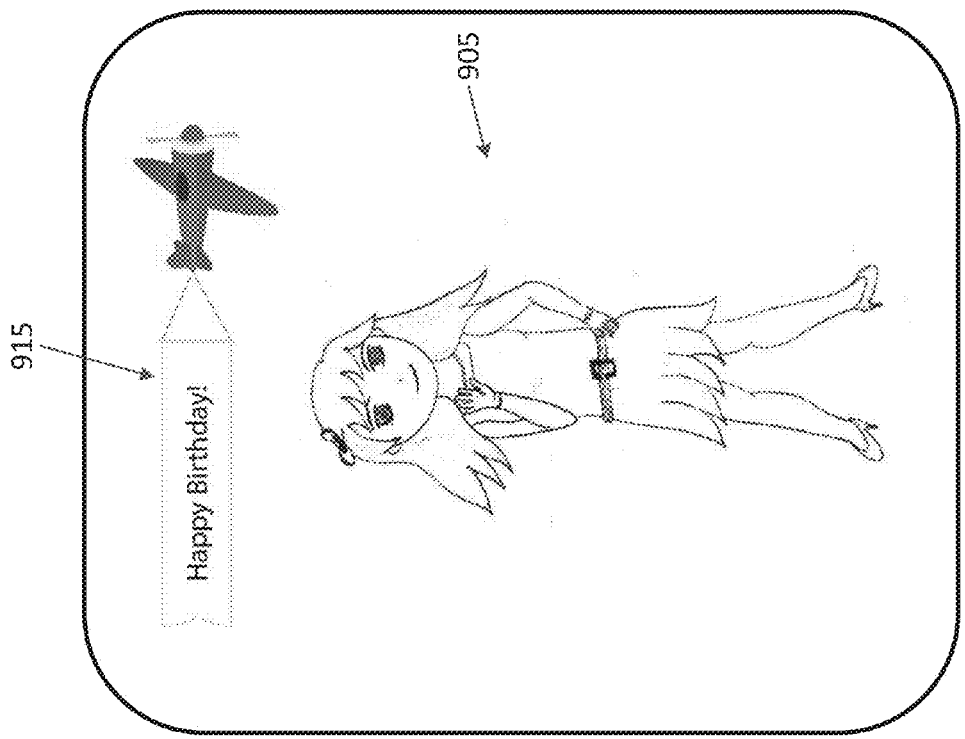

FIGS. 9A and 9B illustrate non-limiting examples of an animated text mechanism, in accordance with embodiments of the present invention. Referring to FIG. 9A, in the present non-limiting example, a graphical scheme may include a "soap bubble." A sender may use a soap bubble image 915 to embed text input. When the sender sends a message, an animation may involve an avatar 905 of the sender blowing an image containing text into a soap bubble 915. The soap bubble 915 with the text may be blown to bigger in size until the animation is over. In the receiver side the same soap bubble animation is played with the sender's avatar which may reveal the text.

Referring to FIG. 9B, In another non-limiting example, a sender may choose a graphical scheme represented as a "sky banner." In the present non-limiting example, graphical components of the sky banner 915 may be an airplane with a long waving banner attached to a tail of the airplane. The airplane may fly across a display screen with the banner attached. The airplane and banner may occupy a top portion of a display with an avatar 905 occupying a lower portion. User inputted text may be situated in the banner. A receiver may receive the message as text included in a banner attached to an airplane traveling across a display screen. In other embodiments the avatar 905 and sky banner 915 may be positioned anywhere in the display screen.

In some embodiments, user interaction may be incorporated for message viewing. In some of these embodiments, a sender may choose a location within an avatar 305 or an environment containing the avatar 305 where a message may be hidden. A receiver may select various areas of the avatar 305 or the environment to find the message. The message may be revealed depending on an area selected by the receiver. In a non-limiting example, a sender may choose to hide a message within an avatar's 305 body or accessory. In the present non-limiting example, the sender may choose a location representing a heart of the avatar 305 and embed a message. Further, in the present non-limiting example, a receiver may receive the message and may be notified that the message may be hidden. The message may be displayed after the receiver selects an area representing the avatar's 305 heart. The receiver may be provided with clues to help the receiver find the message. In some embodiments, receivers may only be given clues after a certain number of unsuccessful attempts to find a message.

In some embodiments, senders may compose messages which may have an expectation of response. These messages may be referred to as action messages. In some embodiments, action messages may allow senders to provide multiple options which receivers may choose from. A receiver may be shown visual options of possible replies which could be responses to an action message or a question asked. A receiver may respond by using a gesture to interact with the avatar 305 and/or scene to choose the response. A selection of an option may result in an automated response with or without additional text from a receiver. A reply may be sent back an original sender and the reply may be played to the sender as a reaction to the action message. In some embodiments the user input may be the combination of inputs such as, but not limited to, touch sensor, gravity sensor, accelerometer sensor, gesture sensors, etc.

Figure 10:
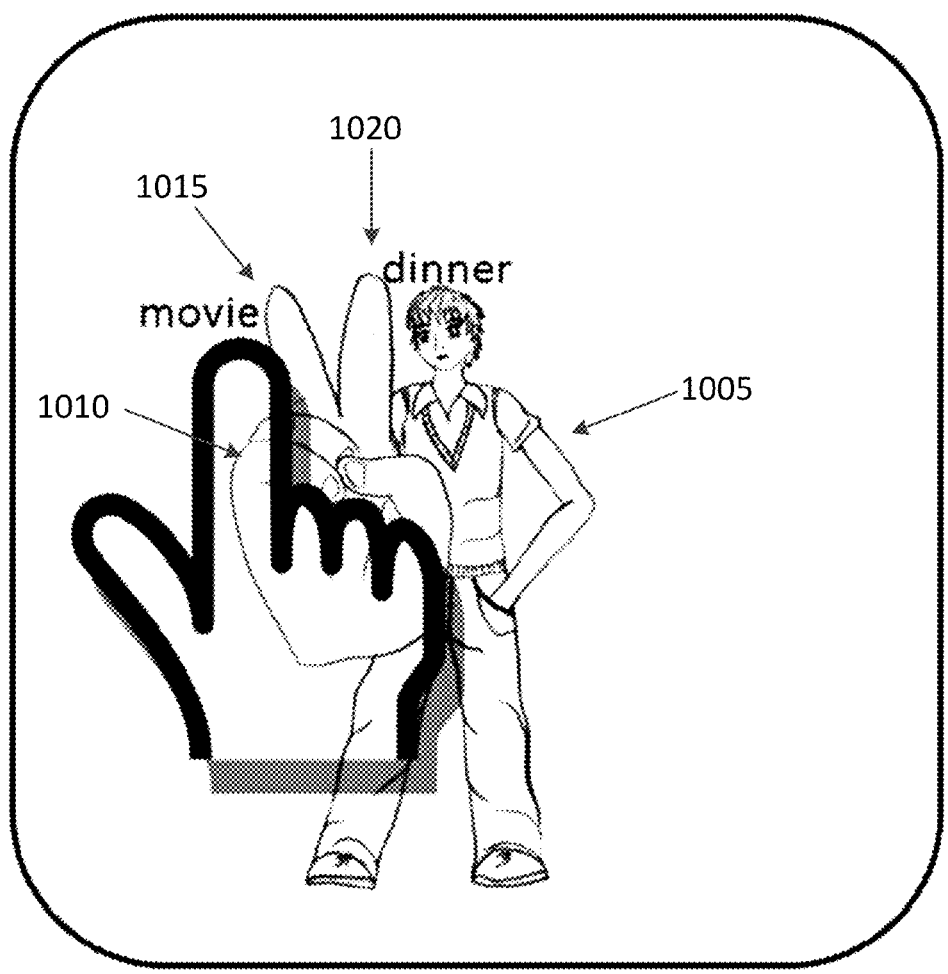
FIG. 10 illustrates a non-limiting example of an action message, in accordance with an embodiment of the present invention.

FIG. 10 illustrates a non-limiting example of an action message, in accordance with an embodiment of the present invention. In the present non-limiting example, a sender may send an action message which may involve an avatar 1005 displaying a "clenched fist" mime 410. The "clenched fist" mime 410 may show a clenched first 1010 with two extended fingers. Each extended finger may display text entered by the sender representing two different options: "movie" 1015 or "dinner" 1020. A receiver may receive the action message and view the "clenched fist" mime 410. Constant reminder may be given in visual form to the receiver to choose an option by touching an extended finger of the avatar 1005. A selected option may be enclosed in a reaction message and sent as an automated response to the sender. A reaction animation for the "clenched fist" mime 410 may depict the avatar 1005 extending only a selected finger from a clenched fist.

In many embodiments, messages may have sub-messages. A sub-message may be a portion of a message which may be delimited by, without limitation, an alphanumeric character, a special symbol, an emotion 405, a mime 410, or any representation of a delimiter. A message received by a receiver may be segmented based on sub-messages and may be played in segments. A segment may be a portion of text within a message along with a supporting emotion 405 and/or mime 410. A message may be broken into multiple segments based on a delimiter.

In some embodiments, stored messages may be retrieved and played at any point in time. A conversation with any user may be shown as part of a text messaging user interface. A user may scroll through a conversation, select a particular message, and replay it. In some of these embodiments, a user may choose a speed of animation motion during message replay.

In some embodiments in which a conversation includes multiple exchanges of messages between users, messages may be displayed in chronological order. Any number of messages in a conversation may be replayed at one time. A user may initiate a "play conversation" feature and any messages in a conversation, both sent and received, may be played back. In some of these embodiments, no user input may be required during playback to move from one message to another. In a few embodiments, a conversation may be converted to video and uploaded to the avatar data server 205. In other embodiments, users may export videos to share or forward conversations. In some embodiments, users may choose to replay only tagged messages.

In many embodiments, messages in a conversation may be dramatized and may be presented as live play or as video. In some embodiments, a default playback setting may be a normal speed. In other embodiments, some messages may be played faster or slower. In other embodiments, some parts within a message may be played faster or slower. In a non-limiting example, untagged messages may be played at a faster speed, while tagged messages or messages with dramatic moments may be played at a slower speed. The dramatization of message being played may depend on the mime and facial animation. Another non limiting example for change of play speed within a message, may be a mime of getting kicked and the associated sequel mime 630, when the recipient avatar gets kicked, may be dramatized by playing it in slow motion and the position of the viewing angle with respect to the user. In this case the face when being kicked could be zoomed in and the animation could be played in slow motion. When the animation is over the face in focus would be zoomed out and the whole avatar would be shown.

In some embodiments, users may add free hand drawings to messages. In some of these embodiments, an object may be available which users may use to draw and erase. An avatar 305 associated with a user may be shown creating a drawing which a user may have created.

Figure 11:
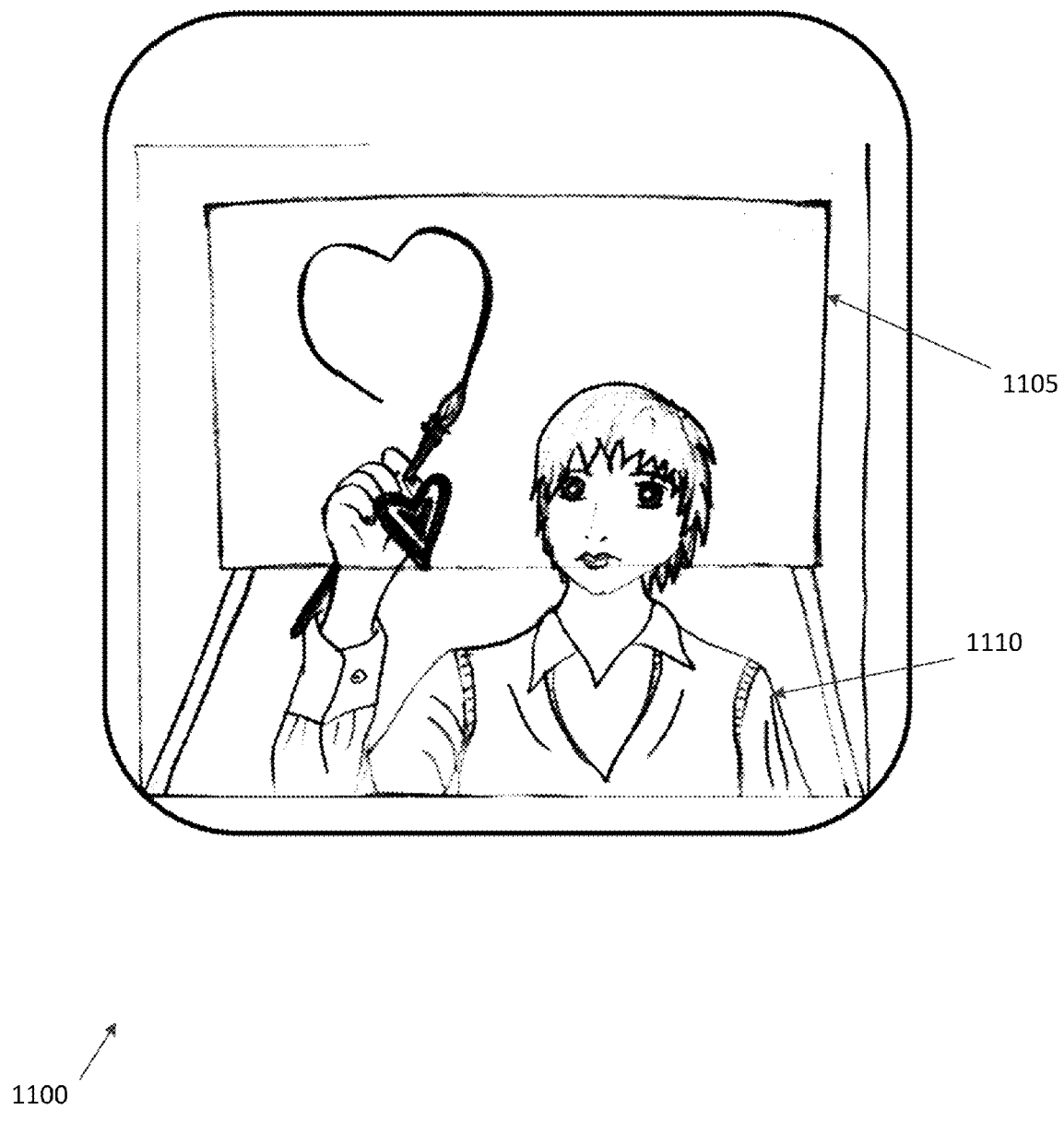
FIG. 11 illustrates a non-limiting example of adding free hand drawing to a message, in accordance with an embodiment of the present invention.

FIG. 11 illustrates a non-limiting example of adding free hand drawing to a message, in accordance with an embodiment of the present invention. In the present embodiment, a user may select a virtual object as a drawing board 1105 and may draw onto the drawing board 1105. Drawing strokes may be captured via touch pad or mouse. An avatar 1110 may be shown mimicking the drawing strokes made by the user. Transmission of drawings from a sender to a receiver may happen in real-time or non-real-time.

In some embodiments, users may use shared virtual objects. In some of these embodiments, a sender may choose a virtual object which may be shared with other users during a conversation. An operation on a shared object may be sent from a sender to a receiver, and the operation of the sender may be displayed by an avatar 305 along with the object. Sending of operations may happen in real-time or non-real-time. An avatar 305 may replicate operations done by a user.

Some embodiments of the present invention may be used in a variety of implementations, including, without limitation, voice calls, video calls, messaging through any social network, emails, customer engagement applications, enterprise and e-commerce applications, non-communication applications such as a virtual assistant, and other implementations such as a virtual charades application.

Figure 12:
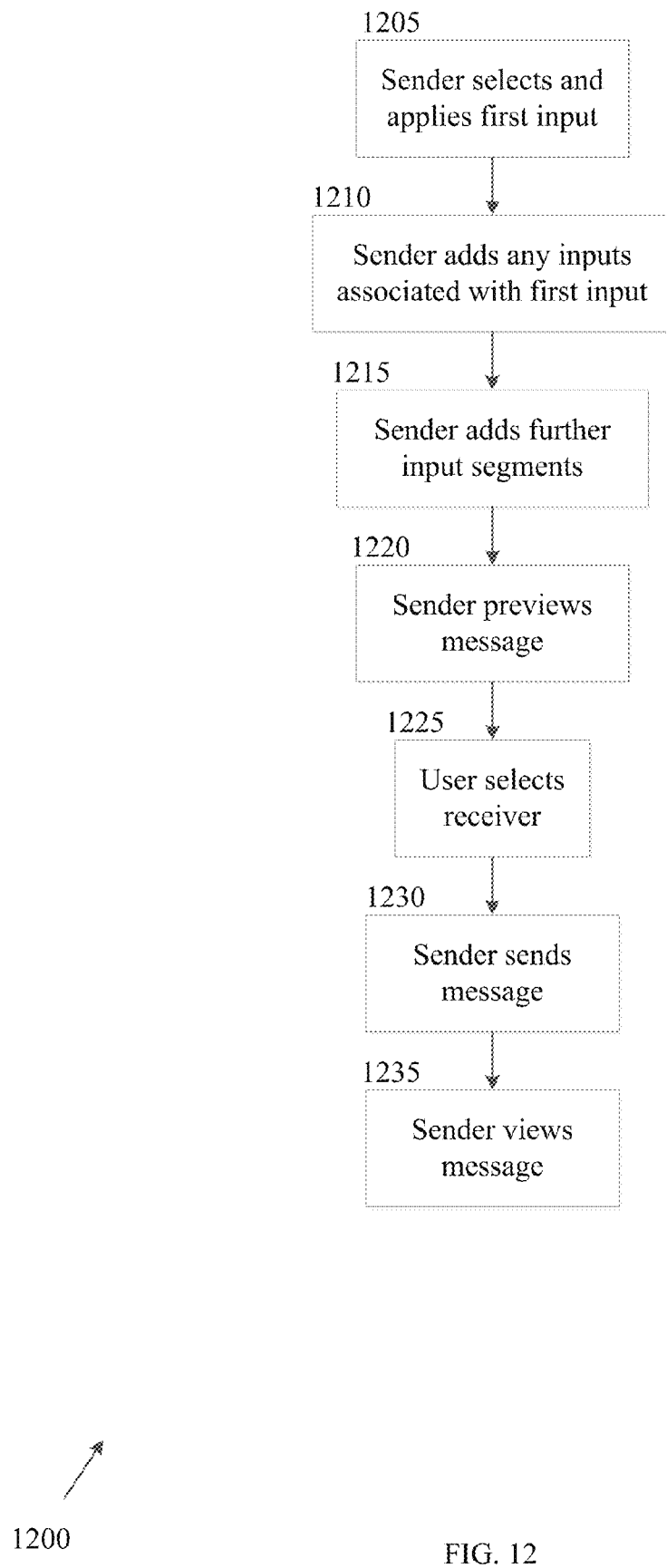
FIG. 12 illustrates an exemplary method for sending a message, in accordance with an embodiment of the present invention.

FIG. 12 illustrates an exemplary method for sending a message, in accordance with an embodiment of the present invention. In the present embodiment, a sender may select and apply a first input to a message in a step 1205. Input for this and any other step may be in any form, including, without limitation, text, avatar 305, emotion 405, mime 410, graphical scheme 505, audio, video, image, background 310, intensity of emotion etc. In the present embodiment, a sender may select various inputs to be associated with the first input in a step 1210. The sender may then add additional inputs in a step 1215. Timing for playback of various inputs may be determined by the sender. In the present embodiment, the sender may preview the message in a step 1220. The sender may make any adjustments to the message before sending. In the present embodiment, the sender may select one or more receivers in a step 1225. The sender may also tag the message or indicate whether it is a chain message or action message. In the present embodiment, the sender may send the message in a step 1230. After sending the message, the sender may view and replay the sent message in a step 1235. In alternative embodiments, users may send sent messages to other users.

Figure 13:
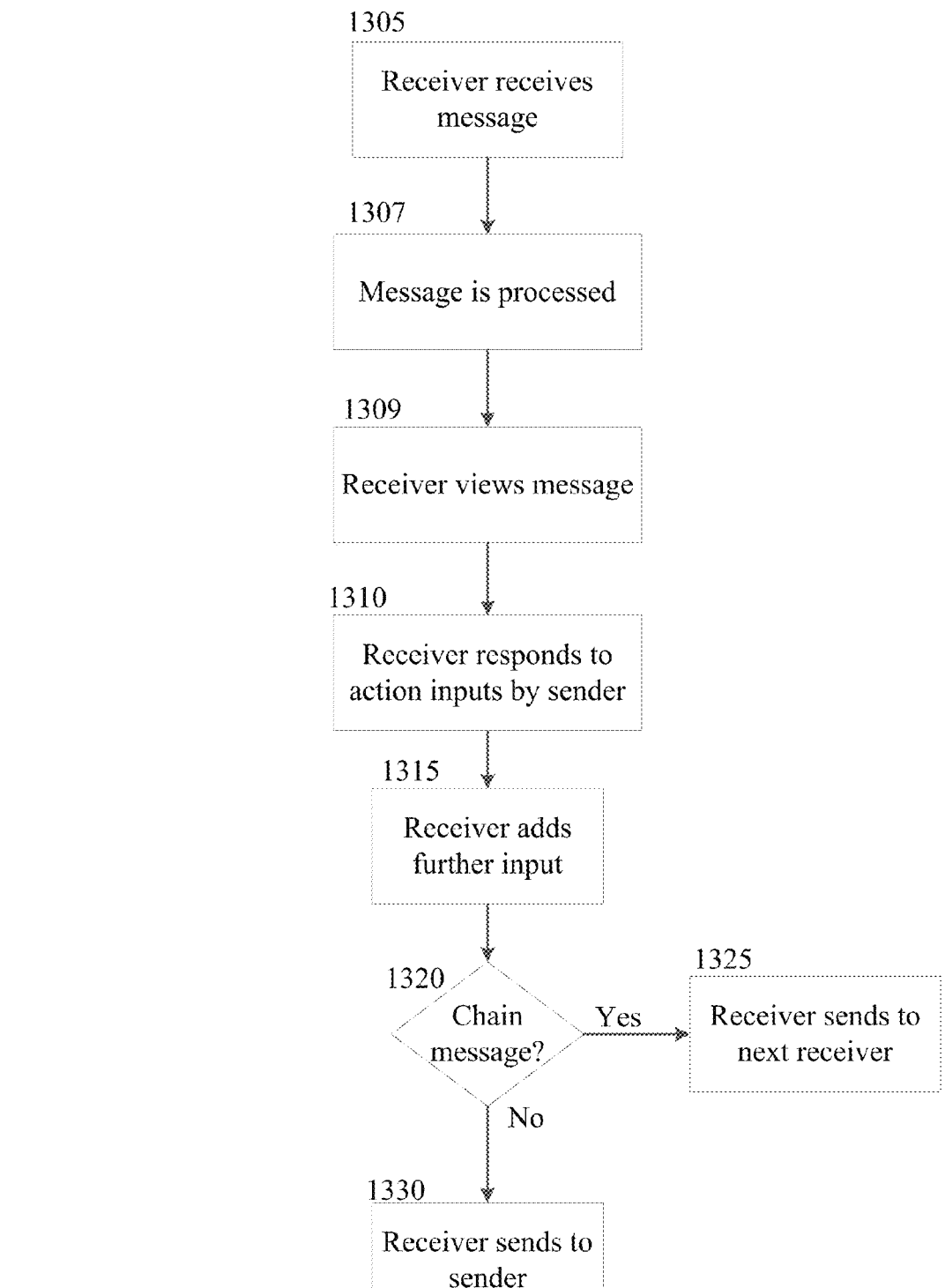
FIG. 13 illustrates an exemplary method for receiving a message, in accordance with an embodiment of the present invention.

FIG. 13 illustrates an exemplary method for receiving a message, in accordance with an embodiment of the present invention. In the present embodiment, a receiver may receive a message in a step 1305. In a step 1307 the received message is processed. As a non-limiting example, the message is parsed and the information comprising of sender avatar, accessories and background scene of the sender are also extracted from the message by the system. The texts, media data and expressions are also extracted and grouped from the other contents of the message. The "expression mode" information is identified from the message and the message is played based on this. The text is displayed in a call out and the expressions are conveyed by the sender avatar animating with facial expressions and body language. If any media data is part of the message, the media is displayed by the avatar to the user. The sequence of the text and the avatar expressions are in the same order as they were constructed during message composition. In a step 1309 receiver may view the message and may be notified with possible ways to interact. If the message is an action message, the receiver may respond to any action inputs in a step 1310. The receiver may add any inputs in a step 1315. Input for this and any other step may be in any form, including, without limitation, text, avatar 305, emotion 405, mime 410, graphical scheme 505, audio, video, image, background 310, etc. It may be determined whether the message is a chain message in a step 1320. If the message is a chain message, the receiver may send the message to a next receiver in a step 1325. If the message is not a chain message, the receiver may send a reply back to the sender in a step 1330. In alternative embodiments, receivers may forward received messages to other users.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 14:
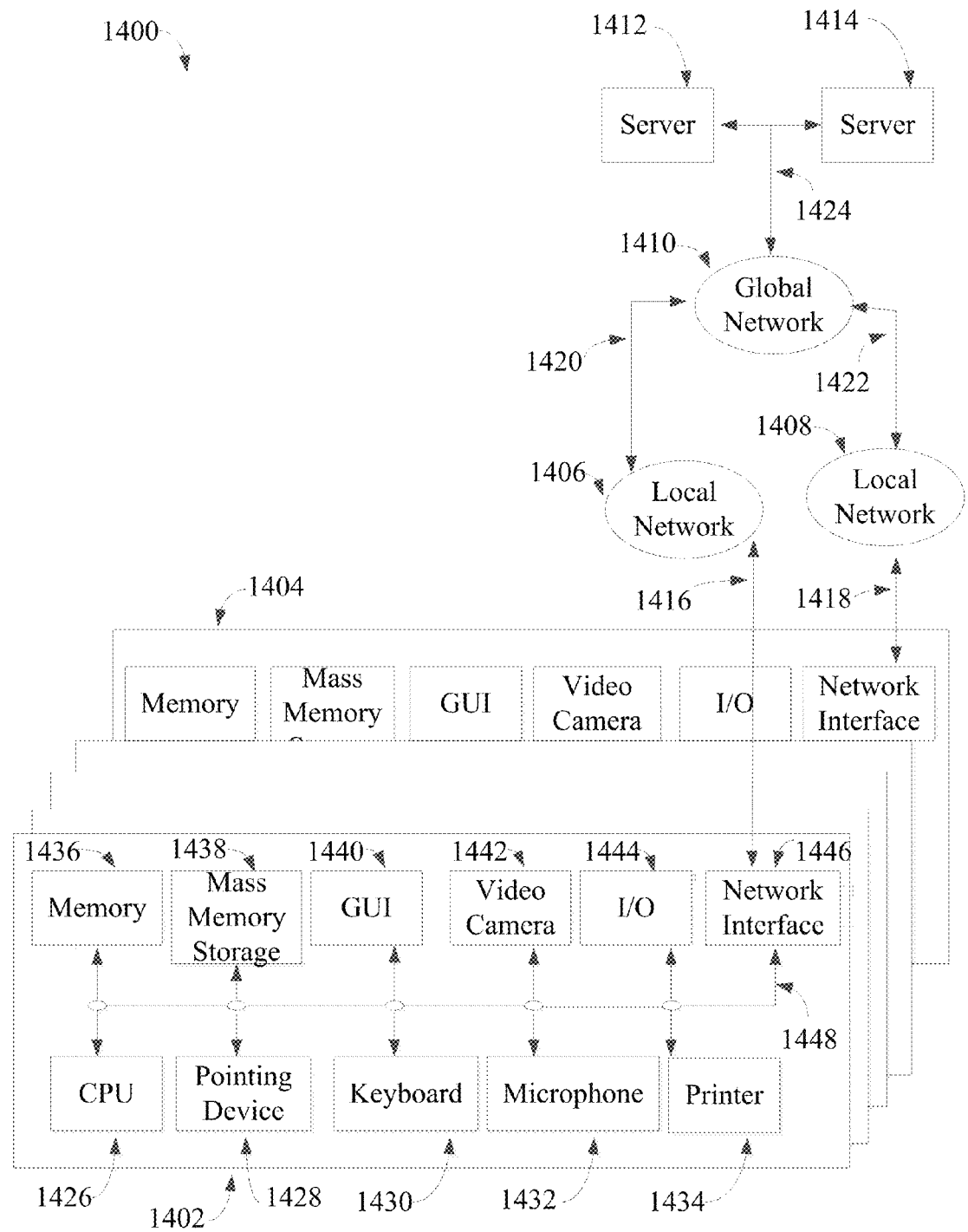
FIG. 14 is a block diagram depicting an exemplary client/server system which may be used by an exemplary web-enabled/networked embodiment of the present invention.

FIG. 14 is a block diagram depicting an exemplary client/server system which may be used by an exemplary web-enabled/networked embodiment of the present invention.

A communication system 1400 includes a multiplicity of clients with a sampling of clients denoted as a client 1402 and a client 1404, a multiplicity of local networks with a sampling of networks denoted as a local network 1406 and a local network 1408, a global network 1410 and a multiplicity of servers with a sampling of servers denoted as a server 1412 and a server 1414.

Client 1402 may communicate bi-directionally with local network 1406 via a communication channel 1416. Client 1404 may communicate bi-directionally with local network 1408 via a communication channel 1418. Local network 1406 may communicate bi-directionally with global network 1410 via a communication channel 1420. Local network 1408 may communicate bi-directionally with global network 1410 via a communication channel 1422. Global network 1410 may communicate bi-directionally with server 1412 and server 1414 via a communication channel 1424. Server 1412 and server 1414 may communicate bi-directionally with each other via communication channel 1424. Furthermore, clients 1402, 1404, local networks 1406, 1408, global network 1410 and servers 1412, 1414 may each communicate bi-directionally with each other.

In one embodiment, global network 1410 may operate as the Internet. It will be understood by those skilled in the art that communication system 1400 may take many different forms. Non-limiting examples of forms for communication system 1400 include local area networks (LANs), wide area networks (WANs), wired telephone networks, wireless networks, or any other network supporting data communication between respective entities.

Clients 1402 and 1404 may take many different forms. Non-limiting examples of clients 1402 and 1404 include personal computers, personal digital assistants (PDAs), cellular phones and smartphones.

Client 1402 includes a CPU 1426, a pointing device 1428, a keyboard 1430, a microphone 1432, a printer 1434, a memory 1436, a mass memory storage 1438, a GUI 1440, a video camera 1442, an input/output interface 1444 and a network interface 1446.

CPU 1426, pointing device 1428, keyboard 1430, microphone 1432, printer 1434, memory 1436, mass memory storage 1438, GUI 1440, video camera 1442, input/output interface 1444 and network interface 1446 may communicate in a unidirectional manner or a bi-directional manner with each other via a communication channel 1448. Communication channel 1448 may be configured as a single communication channel or a multiplicity of communication channels.

CPU 1426 may be comprised of a single processor or multiple processors. CPU 1426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1436 is used typically to transfer data and instructions to CPU 1426 in a bi-directional manner. Memory 1436, as discussed previously, may include any suitable computer-readable media, intended for data storage, such as those described above excluding any wired or wireless transmissions unless specifically noted. Mass memory storage 1438 may also be coupled bi-directionally to CPU 1426 and provides additional data storage capacity and may include any of the computer-readable media described above. Mass memory storage 1438 may be used to store programs, data and the like and is typically a secondary storage medium such as a hard disk. It will be appreciated that the information retained within mass memory storage 1438, may, in appropriate cases, be incorporated in standard fashion as part of memory 1436 as virtual memory.

CPU 1426 may be coupled to GUI 1440. GUI 1440 enables a user to view the operation of computer operating system and software. CPU 1426 may be coupled to pointing device 1428. Non-limiting examples of pointing device 1428 include computer mouse, trackball and touchpad. Pointing device 1428 enables a user with the capability to maneuver a computer cursor about the viewing area of GUI 1440 and select areas or features in the viewing area of GUI 1440. CPU 1426 may be coupled to keyboard 1430. Keyboard 1430 enables a user with the capability to input alphanumeric textual information to CPU 1426. CPU 1426 may be coupled to microphone 1432. Microphone 1432 enables audio produced by a user to be recorded, processed and communicated by CPU 1426. CPU 1426 may be connected to printer 1434. Printer 1434 enables a user with the capability to print information to a sheet of paper. CPU 1426 may be connected to video camera 1442. Video camera 1442 enables video produced or captured by user to be recorded, processed and communicated by CPU 1426.

CPU 1426 may also be coupled to input/output interface 1444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1426 optionally may be coupled to network interface 1446 which enables communication with an external device such as a database or a computer or telecommunications or internet network using an external connection shown generally as communication channel 1416, which may be implemented as a hardwired or wireless communications link using suitable conventional technologies. With such a connection, CPU 1426 might receive information from the network, or might output information to a network in the course of performing the method steps described in the teachings of the present invention.

Figure 15:
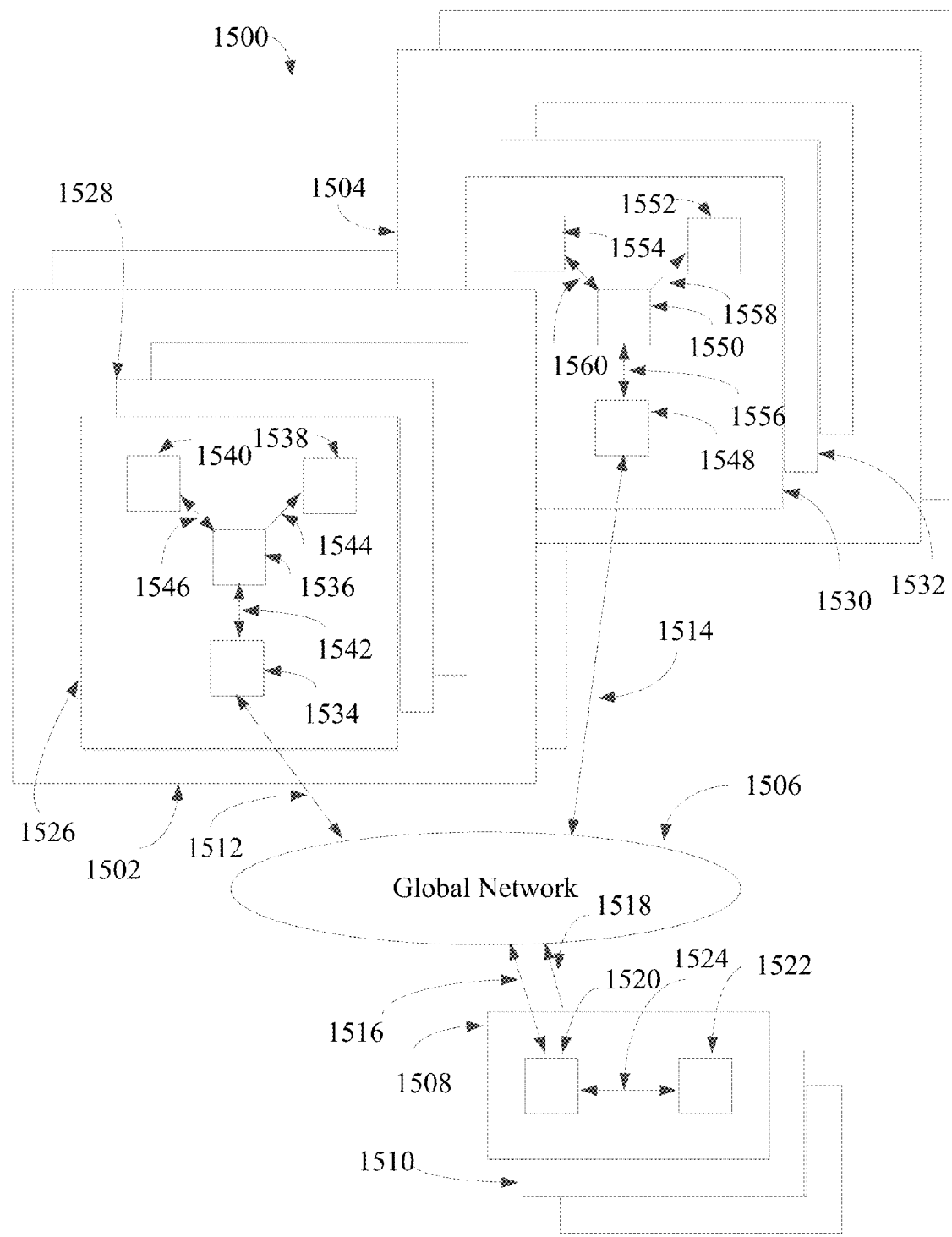
FIG. 15 illustrates a block diagram depicting a conventional client/server communication system.

FIG. 15 illustrates a block diagram depicting a conventional client/server communication system.

A communication system 1500 includes a multiplicity of networked regions with a sampling of regions denoted as a network region 1502 and a network region 1504, a global network 1506 and a multiplicity of servers with a sampling of servers denoted as a server device 1508 and a server device 1510.

Network region 1502 and network region 1504 may operate to represent a network contained within a geographical area or region. Non-limiting examples of representations for the geographical areas for the networked regions may include postal zip codes, telephone area codes, states, counties, cities and countries. Elements within network region 1502 and 1504 may operate to communicate with external elements within other networked regions or within elements contained within the same network region.

In some implementations, global network 1506 may operate as the Internet. It will be understood by those skilled in the art that communication system 1500 may take many different forms. Non-limiting examples of forms for communication system 1500 include local area networks (LANs), wide area networks (WANs), wired telephone networks, cellular telephone networks or any other network supporting data communication between respective entities via hardwired or wireless communication networks. Global network 1506 may operate to transfer information between the various networked elements.

Server device 1508 and server device 1510 may operate to execute software instructions, store information, support database operations and communicate with other networked elements. Non-limiting examples of software and scripting languages which may be executed on server device 1508 and server device 1510 include C, C++, C# and Java.

Network region 1502 may operate to communicate bi-directionally with global network 1506 via a communication channel 1512. Network region 1504 may operate to communicate bi-directionally with global network 1506 via a communication channel 1514. Server device 1508 may operate to communicate bi-directionally with global network 1506 via a communication channel 1516. Server device 1510 may operate to communicate bi-directionally with global network 1506 via a communication channel 1518. Network region 1502 and 1504, global network 1506 and server devices 1508 and 1510 may operate to communicate with each other and with every other networked device located within communication system 1500.

Server device 1508 includes a networking device 1520 and a server 1522. Networking device 1520 may operate to communicate bi-directionally with global network 1506 via communication channel 1516 and with server 1522 via a communication channel 1524. Server 1522 may operate to execute software instructions and store information.

Network region 1502 includes a multiplicity of clients with a sampling denoted as a client 1526 and a client 1528. Client 1526 includes a networking device 1534, a processor 1536, a GUI 1538 and an interface device 1540. Non-limiting examples of devices for GUI 1538 include monitors, televisions, cellular telephones, smartphones and PDAs (Personal Digital Assistants). Non-limiting examples of interface device 1540 include pointing device, mouse, trackball, scanner and printer. Networking device 1534 may communicate bi-directionally with global network 1506 via communication channel 1512 and with processor 1536 via a communication channel 1542. GUI 1538 may receive information from processor 1536 via a communication channel 1544 for presentation to a user for viewing. Interface device 1540 may operate to send control information to processor 1536 and to receive information from processor 1536 via a communication channel 1546. Network region 1504 includes a multiplicity of clients with a sampling denoted as a client 1530 and a client 1532. Client 1530 includes a networking device 1548, a processor 1550, a GUI 1552 and an interface device 1554. Non-limiting examples of devices for GUI 1538 include monitors, televisions, cellular telephones, smartphones and PDAs (Personal Digital Assistants). Non-limiting examples of interface device 1540 include pointing devices, mousse, trackballs, scanners and printers. Networking device 1548 may communicate bi-directionally with global network 1506 via communication channel 1514 and with processor 1550 via a communication channel 1556. GUI 1552 may receive information from processor 1550 via a communication channel 1558 for presentation to a user for viewing. Interface device 1554 may operate to send control information to processor 1550 and to receive information from processor 1550 via a communication channel 1560.

For example, consider the case where a user interfacing with client 1526 may want to execute a networked application. A user may enter the IP (Internet Protocol) address for the networked application using interface device 1540. The IP address information may be communicated to processor 1536 via communication channel 1546. Processor 1536 may then communicate the IP address information to networking device 1534 via communication channel 1542. Networking device 1534 may then communicate the IP address information to global network 1506 via communication channel 1512. Global network 1506 may then communicate the IP address information to networking device 1520 of server device 1508 via communication channel 1516. Networking device 1520 may then communicate the IP address information to server 1522 via communication channel 1524. Server 1522 may receive the IP address information and after processing the IP address information may communicate return information to networking device 1520 via communication channel 1524. Networking device 1520 may communicate the return information to global network 1506 via communication channel 1516. Global network 1506 may communicate the return information to networking device 1534 via communication channel 1512. Networking device 1534 may communicate the return information to processor 1536 via communication channel 1542. Processor 1546 may communicate the return information to GUI 1538 via communication channel 1544. User may then view the return information on GUI 1538.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: avatar 305 creation and creating and sending of messages.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing facilitating communication according to the present invention will be apparent to those skilled in the art. Various aspects of the invention have been described above by way of illustration, and the specific embodiments disclosed are not intended to limit the invention to the particular forms disclosed. The particular implementation of the facilitating communication may vary depending upon the particular context or application. By way of example, and not limitation, the facilitating communication described in the foregoing were principally directed to text messaging implementations; however, similar techniques may instead be applied to other electronic services, including, without limitation, social networks, emails, phone calls, video calls, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
   processing a text message;
   combining said text message with a selected avatar;
   associating an accessory to said avatar, wherein said accessory is configured to change an appearance of said avatar;
   combining said avatar with a selected state of mind, in which said selected avatar state of mind comprises, at least one of, an emotion characterized by a facial expression and a mime characterized by a body language;
   modifying said avatar selected state of mind with a selected intensity level for at least one of, said emotion and mime, wherein said selected intensity level comprises, at least one of a normal intensity level being configured to cause a natural or standard animation for a corresponding emotion or mime, a low intensity level being configured to cause a subdued or subtle animation, and a high intensity level being configured to cause a wide or over reactive animation;

ordering at least said text message, said selected avatar, said selected avatar state of mind, and said selected avatar state of mind intensity level, into an ordered scene;

combining, with at least one of, said ordered scene and said selected avatar, an indication for an interaction with at least one of, said selected avatar and said ordered scene, in which said indication comprising at least a visual notification of said interaction, wherein said indication for interaction with at least one of, said selected avatar and said ordered scene is configured to elicit an interaction with said selected avatar or said ordered scene, and wherein a predefined response is configured to be sent automatically based upon said interaction with at least one of, said selected avatar and said ordered scene; and transmitting said text message, said selected avatar, said selected avatar state of mind, said selected avatar state of mind intensity level, and said indication for receiver interaction, wherein said text message, said selected avatar, said selected avatar state of mind, said selected avatar state of mind intensity level, and said indication for receiver interaction being operable to be viewed in said ordered scene, wherein said ordered scene comprising at least one of: said selected avatar displaying a crying emotion where a don't cry response is automatically transmitted upon an interaction with a tear of said selected avatar, and said selected avatar displaying a clenched first mime with two extended fingers where each extended finger is configured to display said text message representing at least two different options for automatically transmitting a response based upon receiving an interaction input from a receiver to select one of the options being displayed.

2. The method as recited in claim 1, in which said emotion is configured to affect a facial expression of said selected avatar and said mime is configured to affect an animation of a body language of said selected avatar, wherein said emotion and said mime are configured to function independently, and wherein said selected intensity level comprises, at least one of, a normal intensity level being configured to cause a natural or standard animation for a corresponding emotion or mime, a low intensity level being configured to cause a subdued or subtle animation, and a high intensity level being configured to cause a wide or over reactive animation.

3. The method as recited in claim 1, further comprising the step of combining, with said text message, an indication for receiver interaction with said selected avatar to send a reply, in which said interaction at least in part determines said reply.

4. The method as recited in claim 1, further comprising the step of combining with said text message, said selected avatar, said selected avatar state of mind, said selected avatar state of mind intensity level, and said indication for receiver interaction, a selected delivery scheme for displaying said text message, and further comprising the step of interleaving said text message with said selected avatar, said selected avatar state of mind, and selected said avatar state of mind intensity level.

5. The method as recited in claim 1, further comprising the step of combining with said text message, said selected avatar, said selected avatar state of mind, said selected avatar state of mind intensity level, and said indication for receiver interaction, a selected shared object, wherein said shared object being operable for enabling the receiver to view the sender's operations on said shared object.

6. The method as recited in claim 1, further comprising the step of combining with said text message, said selected avatar, said selected avatar state of mind, said selected avatar state of mind intensity level, and said indication for receiver interaction, instructions for chaining said text message to a plurality of receivers.

7. The method as recited in claim 1, further comprising the step of replaying said text message, said selected avatar, said selected avatar state of mind, said selected avatar state of mind intensity level, and said indication for receiver interaction.

8. The method as recited in claim 7, further comprising the step of communicating said replayed text message, said selected avatar, said selected avatar state of mind, said selected avatar state of mind intensity level, and said indication for receiver interaction, to another receiver for viewing, wherein said selected avatar is displayed at certain portions said text message.

9. The method as recited in claim 1, further comprising the step of embedding a hidden text message at a specified location in an area of said selected avatar's body and combining with said text message, said selected avatar, said selected avatar state of mind, said selected avatar state of mind intensity level, and said indication for receiver interaction, wherein an instructions to find said hidden text message is displayed after a certain number of unsuccessful attempts to find said hidden text message.

10. A system comprising:

a sender device being configured to be at least operable for: processing a text message; combining said text message with a selected avatar; combining said avatar with a selected state of mind, the selected avatar state of mind comprises at least one of an emotion characterized by an avatar's facial expression and a mime characterized by an avatar's body language; modifying the selected state of mind with a selected intensity level for a corresponding emotion or mime; ordering at least said text message and the combined avatar into a scene in a specified order; combining an indication for receiving interaction with said scene, wherein said indication comprises at least a visual notification of said interaction; and transmitting said text message, said selected avatar, said selected avatar state of mind, said selected avatar state of mind intensity level, and said indication for receiving interaction;

a receiver device being configured to be at least operable for: receiving said text message, said selected avatar, said selected avatar state of mind, said selected avatar state of mind intensity level, and said indication for receiving interaction; processing said text message, said selected avatar, said selected avatar state of mind, said selected avatar state of mind intensity level, and said indication for receiving interaction; and displaying said text message, said selected avatar, said selected avatar state of mind, said selected avatar state of mind intensity level, and said indication for receiving interaction in said scene to be viewed in said specified order, wherein said scene comprising at least one of: said selected avatar displaying a crying emotion where a don't cry response is automatically transmitted upon an interaction with a tear of said avatar, and said selected avatar displaying a clenched first mime with two extended fingers where each extended finger is configured to display said text message representing at least two different options for automatically transmitting a response based upon receiving an interaction input from a receiver to select one of the options being displayed;
a sensor, in which said sensor comprising at least one of a touch sensor, a gravity sensor, an accelerometer sensor, and a gesture sensor, wherein said sensor is configured to determine a receiver interaction with said scene on said receiver device, where a predefined response is automatically transmitted based on said determined receiver interaction;
a database interface being operable for receiving and distributing information associated with said selected avatar, said selected avatar state of mind, said selected avatar state of mind intensity level, and said indication for receiving interaction, from a storage system;
a controller comprising one or more processors, the controller being configured for processing the information associated with said selected avatar, said selected avatar state of mind, said selected avatar state of mind intensity level, and said indication for receiving interaction; and
a user interface framework, the user interface framework being configured for receiving the processed information; and converting said processed information to a format compatible with said sender device and said receiver device for display.

11. The system as recited in claim 10, in which said intensity level comprises at least one of a low, a normal, a high intensity level of a corresponding emotion at least affecting a facial expression of the avatar and a mime at least affecting an animation of a body language of the avatar, in which said sender device is further configured to be operable for: combining, with said text message, options for receiver interaction with said text message to send a reply to the sender, in which a type of the interaction at least in part determines a type of the reply; combining with said text message a selected delivery scheme for displaying the text message; combining with said text message a selected shared object, the shared object being operable for enabling the receiver to view the sender's operations on the shared object; combining with said text message instructions for chaining said text message to a plurality of receivers; and hiding an additional text message in the scene at a specified location and combining with said text message instructions to the receiver to find the hidden additional text message; and
said sender device and said receiver device are further configured to be operable for communicating with said user interface framework for replaying said text message.

12. A non-transitory computer-readable storage medium with an executable program stored thereon, wherein the program instructs one or more processors to perform the following steps:
processing a text message;
combining said text message with a selected avatar;
combining said avatar with a selected state of mind, said avatar selected state of mind comprises at least one of a group of emotions and a group of mimes;
modifying said selected state of mind with a selected intensity level for said selected emotion or mime;
combining, with said selected avatar, an indication for receiver interaction with said avatar, wherein said indication for receiver interaction being configured to elicit an interaction, and wherein a preconfigured reply is configured to be sent automatically based upon said interaction with said avatar;
ordering at least said text message, said selected avatar, said selected state of mind, said selected intensity level for the selected emotion or mime, and said indication for receiver interaction, into a scene in an order specified by a sender; and
transmitting said text message, said selected avatar, said selected avatar state of mind, said selected avatar state of mind intensity level, and said indication for receiver interaction, to a receiver's device, wherein said text message, said combined avatar, said combined avatar state of mind, said selected avatar state of mind intensity level, and said indication for receiver interaction, being operable to be viewed in said scene in said specified order, and wherein said scene comprising at least one of: said selected avatar displaying a crying emotion where a don't cry response is automatically transmitted upon an interaction with a tear of said avatar, and said selected avatar displaying a clenched first mime with two extended fingers where each extended finger is configured to display said text message representing at least two different options for automatically transmitting a response based upon receiving an interaction input from a receiver to select one of the options being displayed.

13. The program instructing the processor as recited in claim 12, in which said selected intensity level comprises at least one of a normal intensity level being configured to cause a natural or standard animation for a corresponding emotion or mime, a low intensity level being configured to cause a subdued or subtle animation, and a high intensity level being configured to cause a wide or over reactive animation.

14. The program instructing the processor as recited in claim 12, wherein a sensor is configured to determine said interaction with said selected avatar, in which a manner of said interaction at least in part determines said preconfigured reply.

15. The program instructing the processor as recited in claim 12, further comprising the step of combining with said text message, said selected avatar, said selected avatar state of mind, and said selected avatar state of mind intensity level, a selected delivery scheme for displaying said text message, said selected avatar, said selected avatar state of mind, and said selected avatar state of mind intensity level in which said avatar is shown on a right side of a display screen and a receiver's avatar is shown on a left side of said display screen.

16. The program instructing the processor as recited in claim 12, further comprising the step of combining with said text message, said selected avatar, said selected avatar state of mind, and said selected avatar state of mind intensity level, a selected shared object, said shared object being operable for enabling the receiver to view the sender's operations on the shared object.

17. The program instructing the processor as recited in claim 12, further comprising the step of combining with said text message, said selected avatar, said selected avatar state of mind, and said selected avatar state of mind intensity level, instructions for chaining the sender's said text message to a plurality of receivers.

18. The program instructing the processor as recited in claim 12, wherein said scene further comprising at least one of: a soap bubble containing said text message wherein said selected avatar is shown blowing said soap bubble to reveal said text message, and a graphical sky banner where an airplane with a long waving banner showing said text message is attached to a tail of said airplane.

19. The program instructing the processor as recited in claim 12, further comprising transmitting said text message, said selected avatar, said selected avatar state of mind, said selected avatar state of mind intensity level, and said indication for receiver interaction, to another receiver for viewing.

20. The program instructing the processor as recited in claim 12, further comprising hiding an additional text message at a specified location of the scene or avatar and combining with said text message, said selected avatar, said selected avatar state of mind, and said selected avatar state of mind intensity level, instructions to find the hidden additional text message, wherein an instruction to find said hidden text message is displayed after a certain number of unsuccessful attempts to find said hidden text message.

* * * * *